United States Patent [19]
Garza-Tamez

[11] Patent Number: 5,797,227
[45] Date of Patent: Aug. 25, 1998

[54] STRUCTURE STABILIZATION SYSTEM

[76] Inventor: Federico Garza-Tamez, Rio Tamesi 305 Col. Mex., Monterrey N.L., Mexico

[21] Appl. No.: 629,601

[22] Filed: Apr. 9, 1996

[51] Int. Cl.$^6$ ............................................. E04H 9/02
[52] U.S. Cl. ............... 52/167.1; 52/167.2; 52/167.3; 248/561; 248/566; 248/573; 248/581; 188/360; 188/367
[58] Field of Search ................. 52/167.1, 167.2, 52/167.3; 248/561, 566, 573, 581, 605, 614, 631; 188/360, 361, 366, 367

[56] References Cited

U.S. PATENT DOCUMENTS

| | | |
|---|---|---|
| 1,761,321 | 6/1930 | Wells. |
| 1,761,322 | 6/1930 | Wells. |
| 3,110,464 | 11/1963 | Baratoff et al. ............... 248/20 |
| 3,129,531 | 4/1964 | Connor ....................... 50/52 |
| 3,418,768 | 12/1968 | Cardan ....................... 52/167 |
| 3,538,653 | 11/1970 | Meckler ...................... 52/1 |
| 3,632,077 | 1/1972 | Hall et al. .................. 248/400 |
| 3,638,377 | 2/1972 | Caspe ........................ 52/167 |
| 3,726,986 | 4/1973 | Higaki et al. ................ 52/167 |
| 3,731,898 | 5/1973 | Smith ........................ 248/328 |
| 3,789,174 | 1/1974 | Barkan et al. ................ 52/167 |
| 3,796,017 | 3/1974 | Meckler ...................... 52/167 |
| 3,977,140 | 8/1976 | Matsudaira et al. ............ 52/167 |
| 3,986,367 | 10/1976 | Kalpins ...................... 52/167 |
| 4,033,566 | 7/1977 | Petersen ..................... 267/126 |
| 4,042,651 | 8/1977 | Gaurois ...................... 261/111 |
| 4,166,344 | 9/1979 | Ikonomou ..................... 52/167 |
| 4,266,379 | 5/1981 | Valencia Aguilar ............. 52/167 |
| 4,371,143 | 2/1983 | Ishida et al. ................ 248/562 |
| 4,389,141 | 6/1983 | Cumings ...................... 52/167 |
| 4,496,130 | 1/1985 | Toyama ....................... 52/167 |
| 4,554,767 | 11/1985 | Ikonomou ..................... 52/167 |
| 4,574,540 | 3/1986 | Shiau ........................ 52/167 DF |
| 4,587,773 | 5/1986 | Valencia ..................... 52/167 |
| 4,700,932 | 10/1987 | Katsuno ...................... 52/167 |
| 4,860,507 | 8/1989 | Garza-Tamez .................. 52/167 |
| 5,005,326 | 4/1991 | Ishimaru et al. .............. 52/167 R |
| 5,035,394 | 7/1991 | Haak ......................... 298/562 |
| 5,152,110 | 10/1992 | Garza-Tamez .................. 52/167 R |

FOREIGN PATENT DOCUMENTS

| | | | |
|---|---|---|---|
| 872117 | 6/1971 | Canada ......................... | 267/44 |
| 915353 | 11/1972 | Canada ......................... | 267/44 |
| 0079048 | 5/1983 | European Pat. Off. ............. | 52/167 |
| 3200815 | 7/1983 | Germany ........................ | 248/560 |
| 376615 | 4/1973 | U.S.S.R. ....................... | 52/167 |

OTHER PUBLICATIONS

Garza Tamez et al., "Seismic Isolation of the Reforma Newspaper Printing Press Nave in Mexico City, Application of a New Base Isolation System," Aug. 1994, 11 pages.

Garza Tamez et al., "Investigation of Seismic Base Isolation System Based on Pendular Action," *Civil Engineering Studies*, Structural Research Series No. 578, Aug. 1993, UILU-ENE-93-2001, ISSN: 0069-4274 (discussed in application), 85 pages.

Garza Tamez et al., "Test Results and Implementation of Seismic Base Isolation System Based on Pendular Action," *Proceedings,vol. 1*, Second International Conference on Motion and Vibration Control, Aug. 30–Sep. 3, 1994, Yokohama, Japan, Ed. by Yoshida and K. Nonami, pp. 1–6.

*Primary Examiner*—Wynn E. Wood
*Assistant Examiner*—Yvonne Horton-Richardson

[57] ABSTRACT

A stabilization system protects a structure, comprising at least a slab and having a foundation formed in the earth, from the effects of seismic disturbances. Pendulum support elements, secured at upper ends to respective support columns affixed to the foundation and at lower ends to support positions of the slab, support the slab while permitting limited relative movement between the slab and the support columns in the event of a seismic disturbance. A damping system connects the slab to the foundation to impede action of forces tending to produce relative rotation between the slab and the foundation and to provide damped control of relative linear displacements therebetween. A level monitoring system monitors the respective levels of monitoring positions displaced about the slab and detects differential changes in the levels at the monitoring positions, the rods being adjustable to correct for such differential changes and thereby to reestablish a common level condition at all monitoring positions.

30 Claims, 15 Drawing Sheets

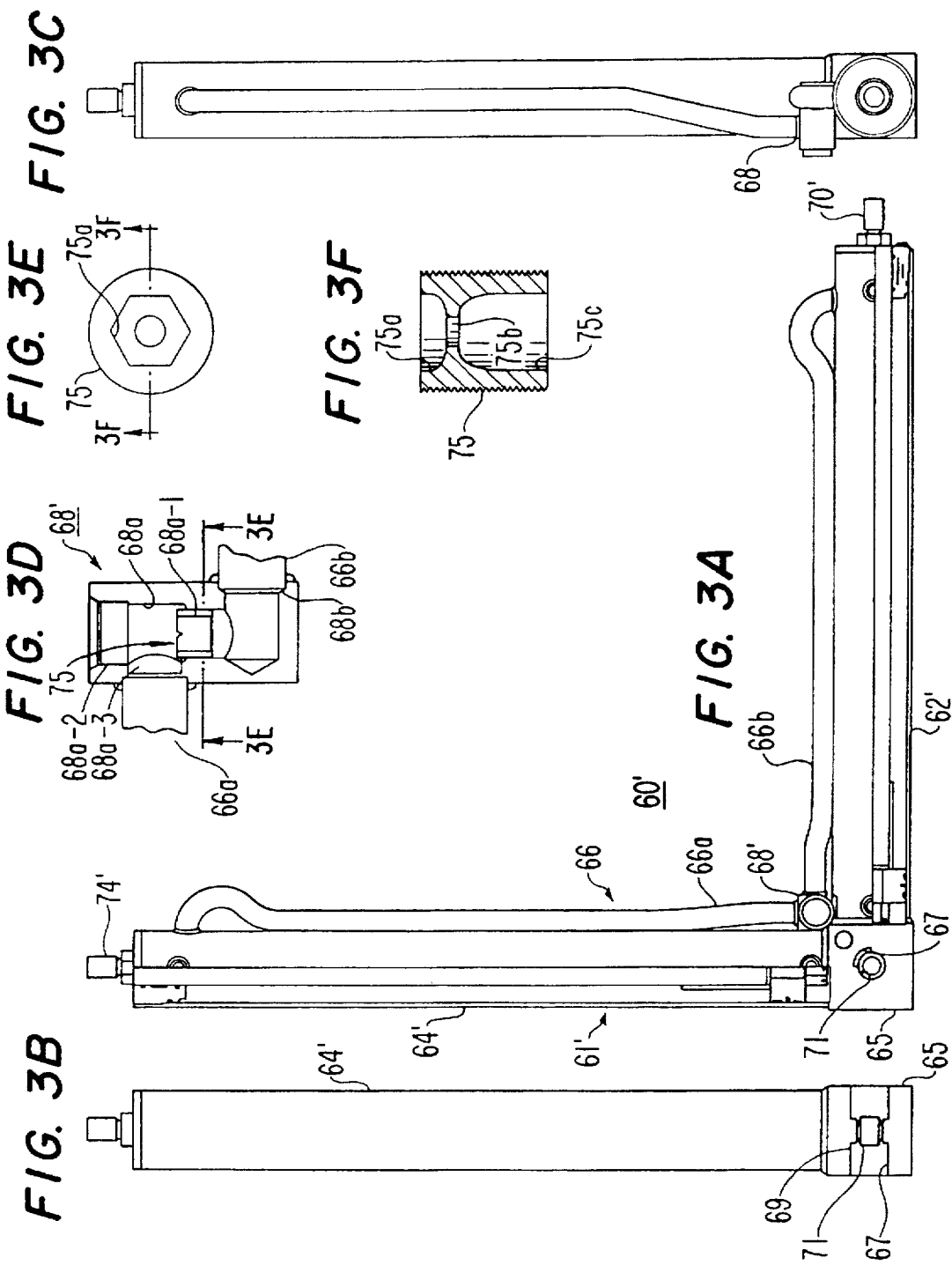

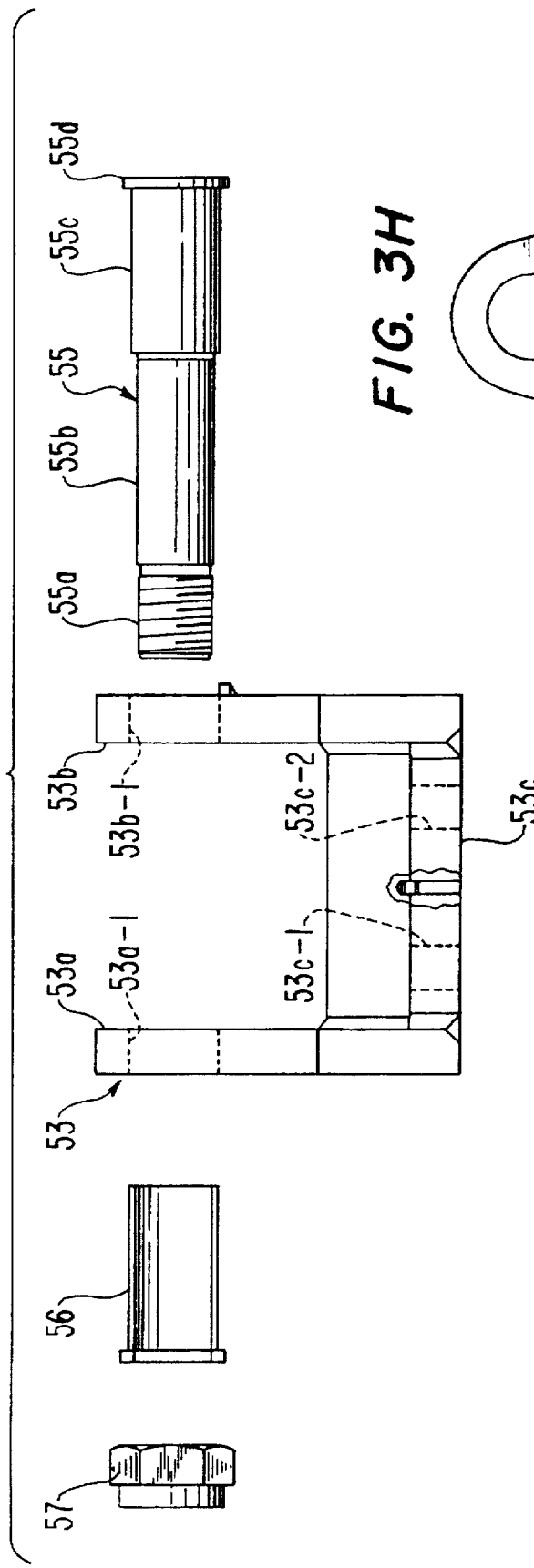

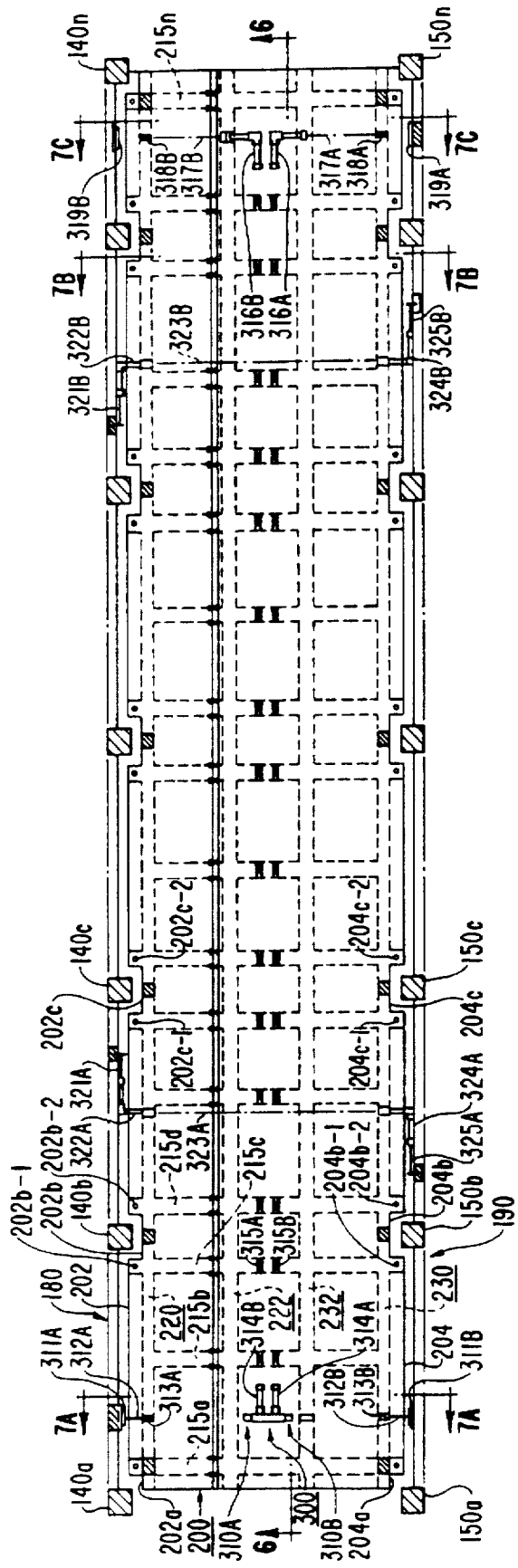
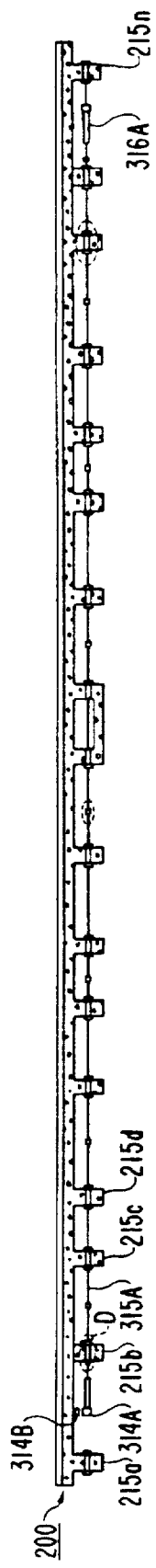
FIG. 5
FIG. 6

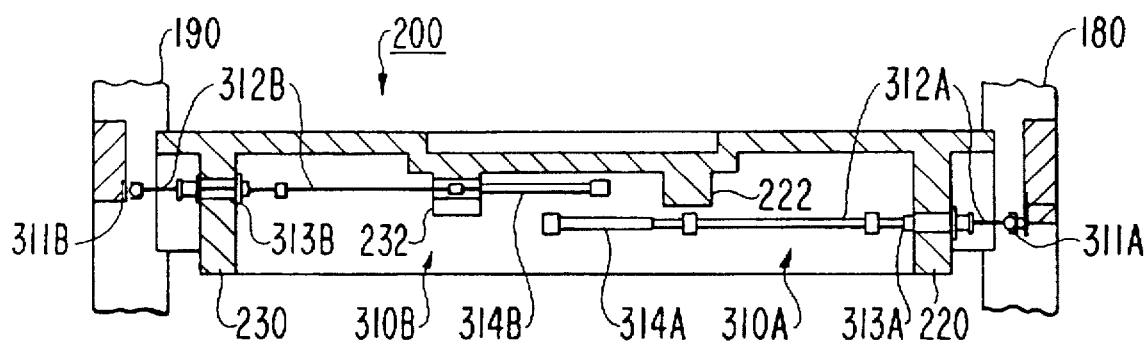
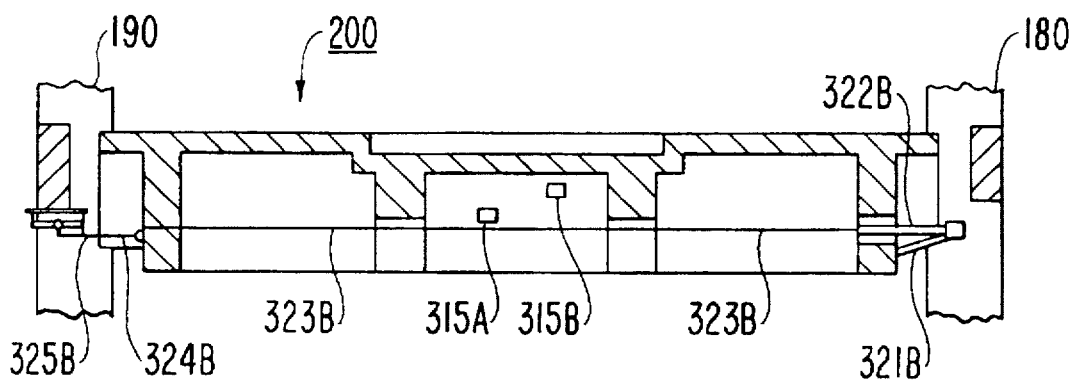
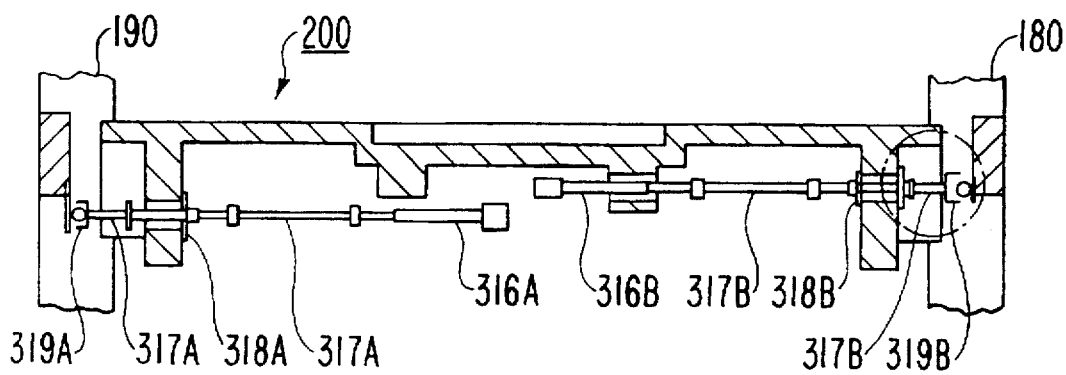

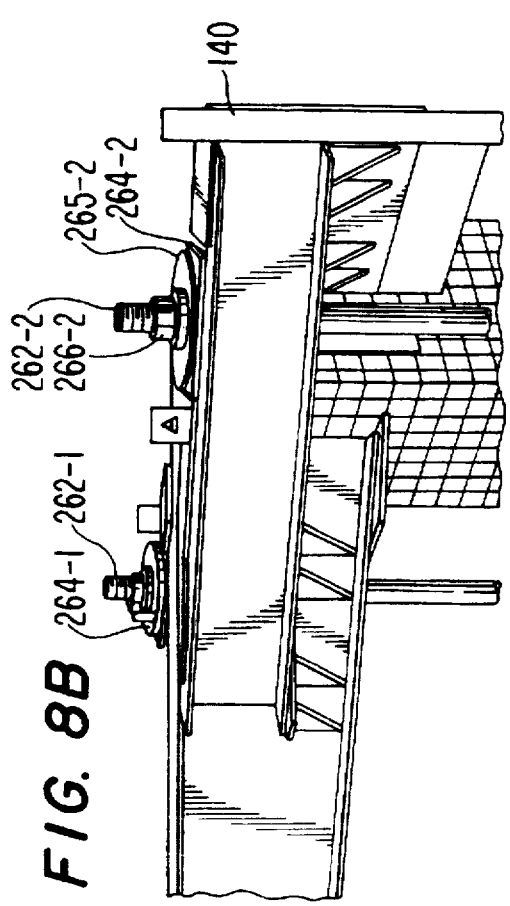
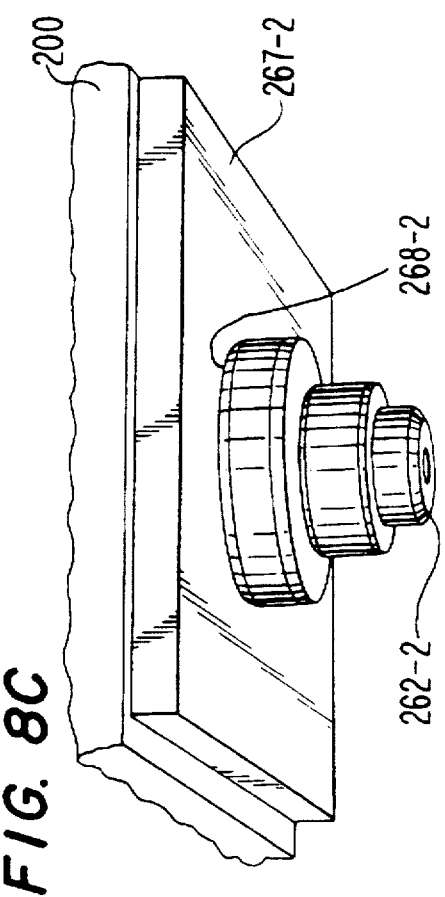
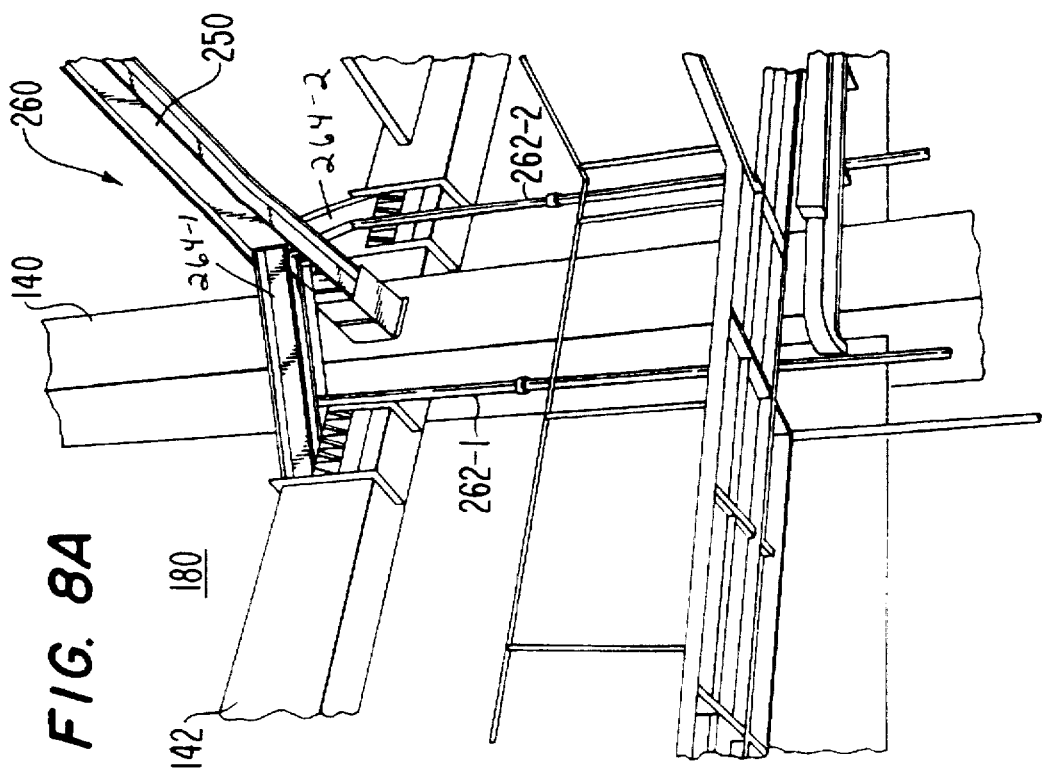

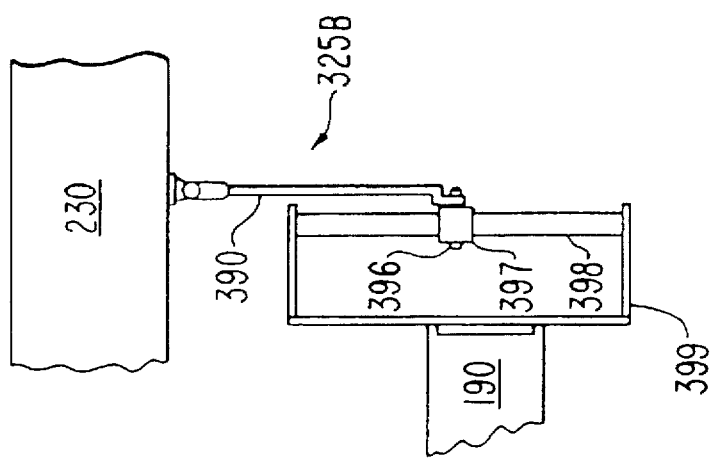
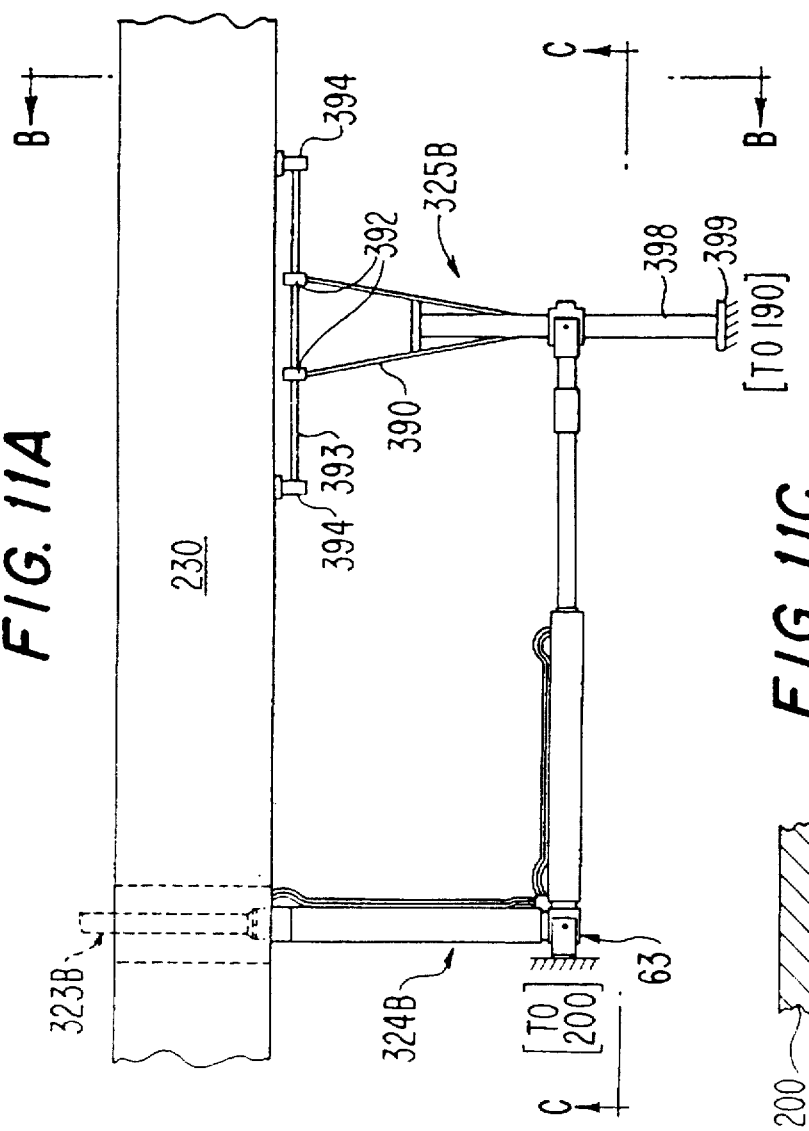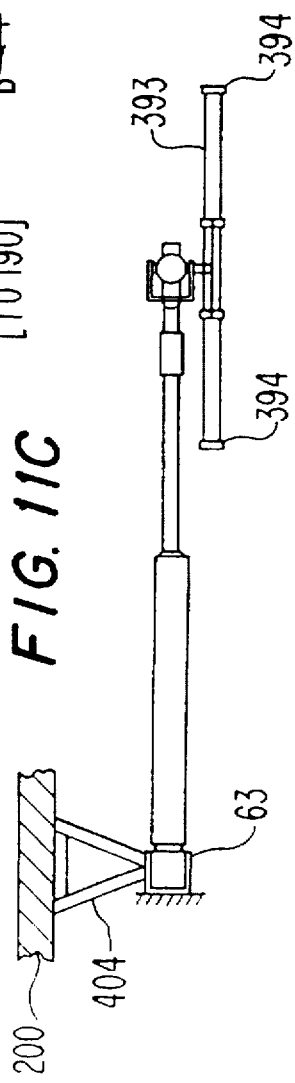

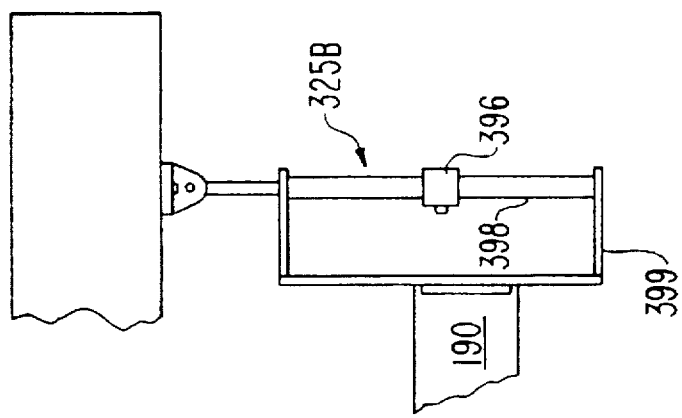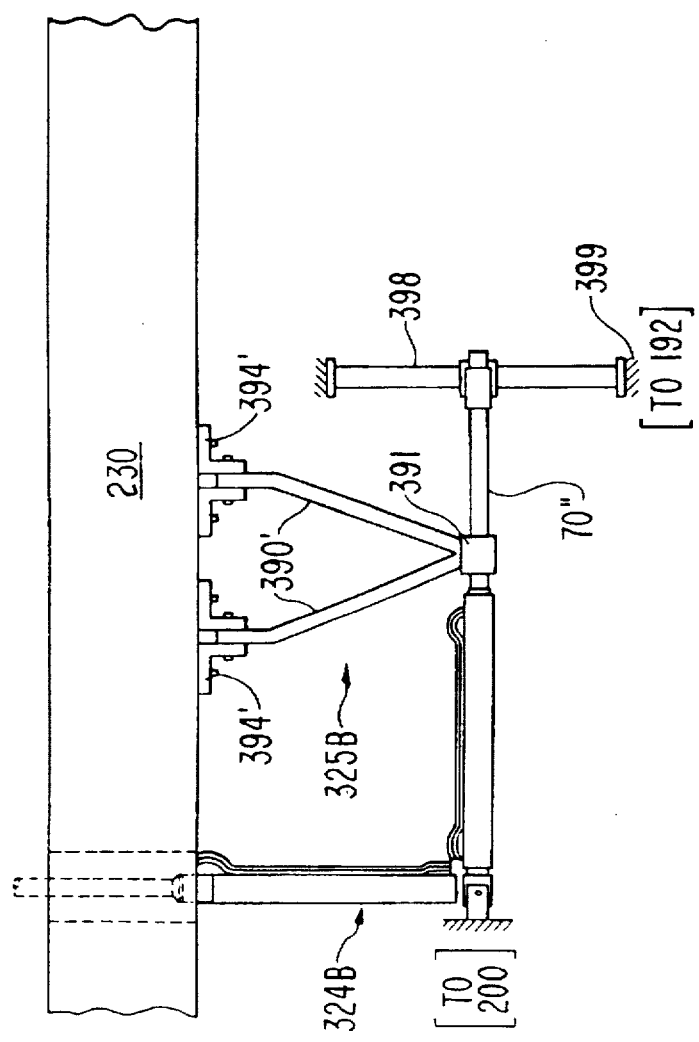

STRUCTURE STABILIZATION SYSTEM

BACKGROUND OF THE INVENTION

1. Field of the Invention

This invention relates to a system for protecting structures, e.g., buildings, bridges and machines such as printing presses, from the effects of seismic disturbances and, more particularly, to an improved such system employing a hydraulic damping system affording improved damping and which facilitates adjustment of the level of damping afforded for the protection of a wide variety of such structures.

2. Description of the Related Art

U.S. Pat. No. 4,860,507 of the present inventor (hereinafter "the '507 patent") discloses a stabilization system for protecting structures, e.g., buildings, from effects of seismic disturbances. A base isolation system employs vertical support columns, suspended by flexible elements from corresponding bases, which provide "floating" support of a structure relative to its foundation, thereby minimizing horizontal movement transmission from the ground, during a seismic event, to the structure. A releasable interlock and damping subsystem is employable independently of, and/or in combination with, the improved base isolation system of the '507 patent. The releasable interlock system normally secures the structure to its foundation against linear displacements, but has an automatic release mechanism which responds to forces above a predetermined threshold level, as may be produced by a seismic disturbance, for automatically unlocking the structure and permitting the same to "float", supported by the base isolation system.

The damping subsystem employs hydraulically interconnected dampers, arranged as one or more pairs, each of which pairs in addition to providing suitable damping to the linear relative displacements, impedes the action of forces tending to produce relative rotation between the isolated structure and the elements fixed to the ground, transforms forces tending to produce relative horizontal rotation, between the structure and its foundation, to damped linear displacement therebetween in a direction parallel to the direction of the damping mechanisms. The dampers of each pair are mechanically connected in respectively inverted relationship between, and on corresponding opposite sides of, the structure and its foundation (or other support fixedly secured to the ground). As a practical matter and preferably, orthogonally related such pairs of dampers are connected to corresponding orthogonally related sets of opposing foundation walls, to damp linear displacement of the structure in the corresponding, orthogonal directions.

Each of the dampers comprises a hydraulic cylinder having a piston defining corresponding subchambers therein, the subchambers of one damper being interconnected through corresponding hydraulic lines with respective subchambers of the associated, other damper of the pair. The piston is moveable, against the pressure of hydraulic fluid contained the damper, by the forces resulting from a seismic disturbance and tending to produce relative movement between the structure and its foundation walls, the forces being coupled through the piston rod to the piston. Any tendency of the structure to rotate, relative to the foundation walls, produces rotational opposing forces through the interconnected dampers; thus, only damped relative lateral displacement is permitted to occur between the structure and the foundation walls. Thus, a single pair of dampers serves both to impede relative rotation and also to permit damped, relative lateral displacement in a direction parallel to the parallel-axial orientation of the dampers.

U.S. Pat. No. 5,152,110 of the present inventor (hereinafter "the '110 patent") discloses improved such damping systems employing hydraulic dampers of "L-shaped" configuration which provide a hydraulic parallel-to-perpendicular force, or displacement, transformation. Each damper, again, is of a dual chamber configuration, the adjacent chambers of the L-shaped dampers being directly hydraulically connected and the remote sub-chambers being hydraulically interconnected through a valved conduit; the valve is adjustable, thereby to set the desired level of damping. A pair of two associated L-shaped dampers, mechanically interconnected, provides the force/relative velocity transformation function needed for the above-mentioned desired damping, with direct and precise control of impeded relative rotation.

The disclosures of the '507 and '110 patents are expressly incorporated herein by reference and effectively as though each were directly incorporated herein in its entirety.

The systems and improvements disclosed in the '507 and '110 patents, have proven to be highly effective as set forth in a publication by Foutch et al., "Investigation of a Seismic Base Isolation System Based on Pendular Action," *CIVIL ENGINEERING STUDIES*, Structural Research Series No. 578, August 1993, UILU-ENG-93-2001, ISSN: 0069-4274, which reports on testing conducted by the authors, including the inventor herein, at the Department of Civil Engineering, University of Illinois at Urbana-Champaign, Urbana, Ill., copy thereof submitted herewith and incorporated herein.

There remains a continuing need for improvements in such systems to enhance the effectiveness of same and to broaden the range of applications in which they may be employed while simplifying the implementation of same as well. For example, it is highly desirable to be able to adapt the principles of the base isolation system to providing protection of machinery, such as a printing press, from seismic disturbances, where the printing press is to be installed and operated in a pre-existing building which has no, or inadequate, seismic protection; it is also desirable to enable enlarging the support structure to accommodate larger, or additional, related equipment, without having to modify the base isolation and damping support subsystems, both as a matter of convenience and to assure that a unitary, or integral, support structure is afforded. In other words, since it is necessary that the support structure function as a unitary element when in a floating condition resulting from a seismic disturbance, it is highly desirable that the support structure be adaptable for expansion in a way which avoids the need to redesign the base isolation and damping systems. Further, improvements for applying the principles of the base isolation systems of the prior patents to buildings of irregular or non-standard configurations (e.g., an oblong building, having a longitudinal dimension which is substantially greater than a lateral, transverse dimension) are also required.

SUMMARY OF THE INVENTION

Accordingly, it is an object of the present invention to provide improved base isolation and damping systems for protecting structures from the effects of seismic disturbances.

It is a further object of the invention to provide a base isolation and damping system employing hydraulic damping elements having special mounting structures which protect the hydraulic elements from potential damage, resultant from forces acting thereon in a direction transverse to the axial direction of hydraulically damped movement of the hydraulic damping elements.

Yet another object of the invention is to provide an improved base isolation and damping system affording floating support of a structural element within an isolated, or a non-isolated, housing structure.

Yet another object of the invention is to provide a base isolation-type floating support for a support slab on which machinery is mounted and which is further stabilized by a damping subsystem thereby to protect such support slab, and thus the machinery mounted thereon, from damage by seismic disturbances.

Still a further object of the present invention is to provide an improved pendulum-type floating support for base isolation but which furthermore incorporates therewithin damping, or energy dissipation elements associated with the moving components of the pendulum system and which may include any of viscous-, frictional- or hysteresis-type damping and energy dissipation elements.

Still a further object of the invention is to provide a system for monitoring relative height positions of the base isolated structure, thereby to detect any misalignment conditions which have arisen, e.g., due to settlement of foundations of the columns and, further, to enable correction of any such detected misalignment or other instability conditions. This is important, not only to avoid development of overstressing, cracking or other adverse conditions in the isolated structure which could lead to premature weakening and failure of same during a seismic disturbances, but also to maintain the leveling requirements, set by the manufacturer, of the equipment supported on the base isolated structure.

Still a further object of the present invention is to protect against tampering with the damping system and particularly with the valved control of damping through the use of orifice plugs, in place of valves, in the hydraulic conduits and which set the requisite rate of flow of the hydraulic fluid in accordance with the desired damping characteristics.

Still another object of the present invention is to enable the elongation, in one dimension, of a structure supported by the base isolation and damping system of the invention, without modification thereof.

While the base isolation and damping system of the present invention is disclosed herein for providing seismic protection for a structure (e.g., a slab) on which expensive equipment such as a high speed printing press is mounted, it will be appreciated that the system has broader applicability and, for example, may be employed to protect an entire structure, or building, as disclosed in the above-referenced patents of the inventor; further, each of the pendulum-type base isolation subsystem and the damping subsystem may be employed independently of the other and, instead, with respectively different damping and base isolation subsystems.

In accordance with the present invention, the base isolation system comprises a support frame assemblage of a plurality of vertical support columns arranged in a pair of parallel (longitudinal) rows and secured to the earth (e.g., such as by pilings). The respective vertical support columns of the parallel rows are disposed in paired, spaced relationship; longitudinal support beams interconnect the respective columns of each row and transverse (or lateral) support beams extend between and interconnect the paired columns of the parallel rows.

A support slab is disposed between the parallel rows of vertical support columns and the associated, longitudinally extending support beams, so as to extend in parallel therewith in the longitudinal direction with the parallel longitudinal edges of the slab spaced from the columns by a distance at least as great as, but not significantly exceeding, the likely distance of lateral travel, or relative displacement, of the slab in the event of a seismic disturbance. Elongated pendulums, e.g., solid core steel rods or heavy cables, are engaged at upper ends thereof to upper portions of the vertical support columns and at lower ends thereof to the slab, affording a pendulum-type suspension of the slab from the vertical support columns. The vertical support columns extend vertically above the slab to a distance at least as great as the required free suspension length of the pendulums (e.g., as defined in the '507 patent).

In a presently preferred embodiment, solid core steel rods are employed having threaded upper ends which are inserted through support plates attached to the vertical columns and receive a nut thereon, adjustment of the nut then additionally adjusting the depending, free length of the rod and correspondingly adjusting the elevation of the slab, as defined by that rod. The lower end of each rod has a hemispherical configuration of a larger radius than that of the rod (i.e., a "knuckle element"), which functions as a dry bearing surface and which is received in frictional engagement within a corresponding socket secured in the slab at an associated position on the longitudinal edge of the slab to form a knuckle joint. The upper end of each rod has a similar knuckle joint joint arrangement. Each knuckle element is movable within its corresponding socket, so that the slab may float relatively to, and thereby be isolated from, the support columns and related support structures which are subject to movement due to seismic disturbances. As noted, the frictional engagement provides damping only after a small relative displacement of the rods' ends, supplementing the damping control afforded by the hydraulic damping subsystem which is used with the base isolation system.

More particularly, a hydraulic damping sub-system, substantially in accordance with the teachings of the above '507 and '110 patents, interconnects the support slab to the vertical support columns of the support frame or otherwise to the earth. The hydraulic damping subsystem, in addition to providing suitable damping to the linear relative displacements, impedes the action of forces tending to produce relative rotation between the isolated structure and the elements fixed to the ground, as above discussed.

The damping subsystem of the present invention, moreover, employs mounts providing pivotal and/or sliding connections between the hydraulic dampers and one or both of the slab and the support frame elements so as to provide freedom of movement therebetween in the necessary directions for isolating the piston rods of the dampers from forces which would act with a component perpendicular to the axial direction of movement of the piston rod. Particularly, a typical hydraulic damper has a hydraulic chamber within which a piston moves in an axial direction, the piston having a head within the chamber and a piston rod extending therefrom, in axial alignment with the axis of the chamber. The present invention provides for mounting each damper, as connected between the slab and the support frame (i.e., the support columns and associated support beams) so as to have freedom of motion in directions perpendicular to the alignment axis of the piston rod and damper chamber. The freedom of movement prevents any force having a component transverse to the axial direction from impeding the axial movement of the piston rod relative to the damper chamber and thus altering the damping characteristics and, in a worst case scenario, from permanently bending and thus damaging the piston rod and destroying the damping function.

In a preferred embodiment, the machinery-supporting slab is suspended by the pendulum-type base isolation support system, with at least the longitudinal (i.e., longer) opposed parallel edges of the rectangular slab disposed in parallel and closely spaced relationship to corresponding, parallel support elements of a non-isolated (or, optionally, a further-isolated) support frame structure. A gap thus is defined between the longitudinal edges of the slab and the corresponding longitudinally extending support walls, the gap being of a dimension, in the lateral direction transverse to the longitudinal direction, of sufficient size to accommodate the maximum extent of potential lateral movement of the slab, relatively to the support elements, resultant from a maximum seismic disturbance. While the opposite ends of the slab have no surrounding support frame elements, whereby the slab may be extended (i.e., elongated), the system is designed to accommodate an equal, maximum extent of potential longitudinal movement of the slab and thus corresponding gaps are provided about the slab periphery in the longitudinal direction to accommodate the maximum extent of potential longitudinal movement of the slab, relatively to the support elements, resultant from a seismic disturbance.

Coordinated pairs of L-shaped dampers are disposed so as to span the gap, at displaced positions along the length of the support slab, first and second dampers of each pair being mechanically connected to corresponding positions of the support slab along the respective, first and second opposite longitudinal edges thereof. Each damper further is connected to the parallel support wall, the mechanical connections providing the afore-described freedom of motion in the mutually orthogonal directions, commonly perpendicular to the damping axis of the damper. The dampers furthermore are interconnected in the manner taught by the '110 and '507 patents so as to transform potential rotary movement of the support slab to translational (i.e., longitudinal) movement parallel to the longitudinal edges of the support slab and the corresponding parallel support walls of the support structure.

The foregoing and other objects and advantages of the present invention will become clear with reference to the accompanying drawings, wherein like numerals refer to like parts throughout.

BRIEF DESCRIPTION OF THE DRAWINGS

FIGS. 3A–3C are plan and first and second side elevational views of an L-shaped damper, FIG. 3F is an enlarged schematic illustration of an orifice plug assembly employed in the damper and FIGS. 3E and 3F are cross-sectional views of the orifice plug respectively taken in a plane along line 3E—3E in FIG. 3D, and in a plane along line 3F—3F in FIG. 3E and, further, FIGS. 3G and 3H respectively are an exploded elevational view and an end view of a clevis assembly for mounting the damper;

FIG. 5 is a schematic, plan view, partly in cross-section, of the support frame structure and slab of FIG. 4 including further details of the hydraulic damping system in accordance with the present invention;

FIG. 6 is a schematic, elevational view, partly in cross section, in plane along line 6—6 in FIG. 5;

FIGS. 7A, 7B and 7C are schematic, elevational views, partly in cross section, of the support frame structure and slab in respective planes taken along lines 7A—7A, 7B—7B and 7C—7C in a FIG. 5;

FIG. 8A is a fragmentary view of an upper portion of a vertical support column, of associated lateral and diagonal support beams which support the upper ends of the pendulum rods of the base isolation system of the invention, and of an upper knuckle joint;

FIG. 8B is an enlarged fragmentary view of the upper end portion of the structure shown in FIG. 8A, which includes a lower knuckle joint;

FIG. 8C is an enlarged fragmentary view of the connection of the lower end of a support on to a corresponding edge portion of the slab;

FIG. 11A is a fragmentary planar view and FIGS. 11B and 11C are end and side elevational views, respectively, all thereof partially in cross section and on an enlarged scale, of the damping and transformation unit of the second type of FIG. 5 and of the associated mount therefor;

FIG. 12A is a fragmentary planar view and FIGS. 12B and 12C are end and side elevational views, respectively, all thereof partially in cross section and on an enlarged scale, of an alternative embodiment of a damping and transformation unit of the second type shown in FIG. 5 and of the associated mount;

DESCRIPTION OF THE PREFERRED EMBODIMENTS

Figure 1:
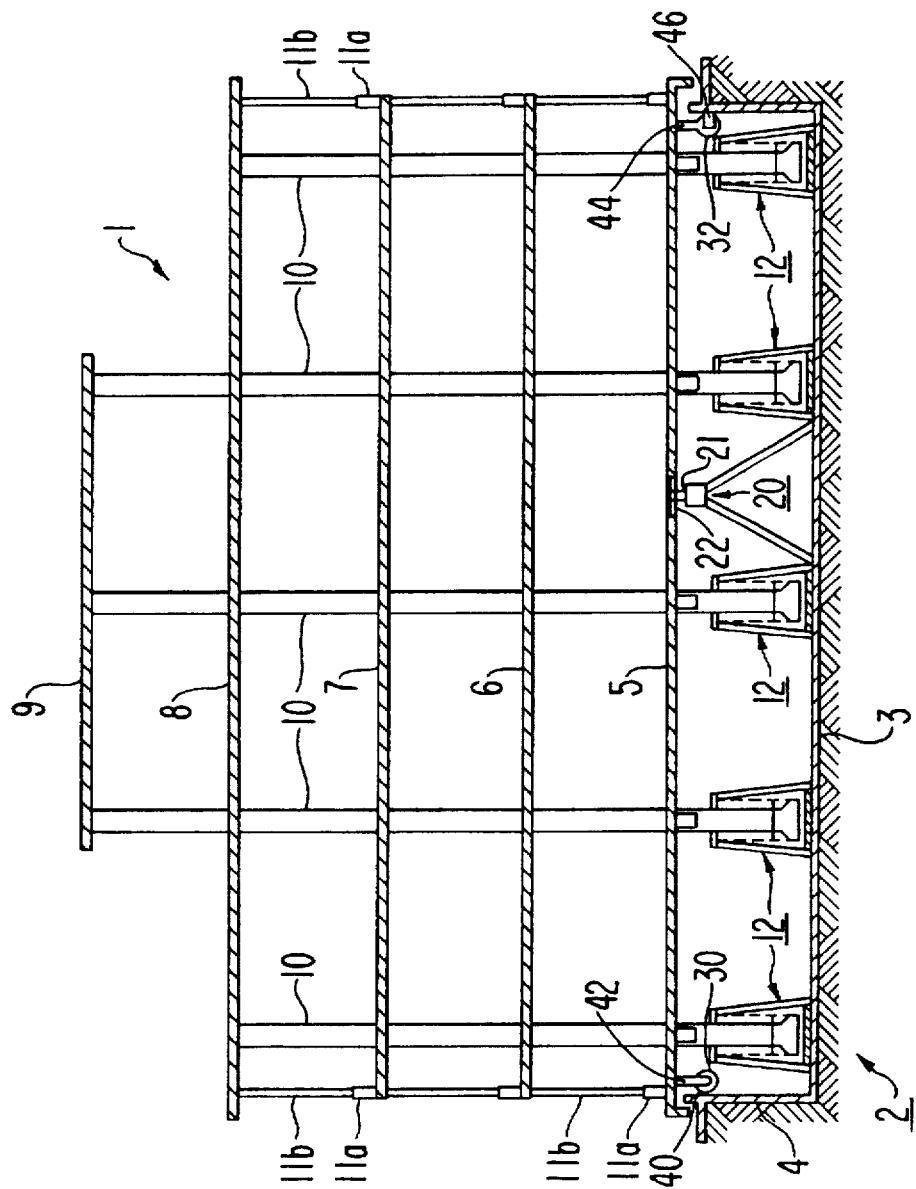
FIG. 1 is a schematic, elevational and cross-sectional view of a structure and related support foundation incorporating a structure stabilization system in accordance with the afore-noted patents but incorporating an improved damping and transformation element.

Reference will now be made in detail to the accompanying drawings illustrating the preferred embodiments of the present invention and wherein like reference numerals refer to the same or similar elements throughout.

FIG. 1 illustrates, in schematic form, a structure 1, e.g., a building, having an associated foundation 2 comprising a horizontal basement floor 3 and vertical foundation walls 4. The floors 5, 6, 7, 8 and 9 of the structure 1 are individually connected to and supported by a plurality of vertical support columns 10, the exterior vertical surfaces of structure 1 being enclosed by walls 11a and glass panels 11b.

The support columns 10 are supported in suspension at their respective, lower ends by corresponding bases 12 which, together, comprise a base isolation system which minimizes the transmission of horizontal movement from the ground (and, thus, the foundation 2) to the structure 1, in the event of a seismic disturbance. Effectively, the base isolation system permits the structure 1 to "float" with respect to its foundation 2, upon the occurrence of a seismic disturbance which exceeds acceptable limits, as hereinafter discussed. Hydraulic damping and transformation systems 30, 32 are disposed at opposite locations, connected to corresponding, parallel opposite walls 4 of the foundation 2 by integral wall brackets 40 and 46, respectively, and by brackets 42 and 44, respectively, to the floor 5 and thereby to the structure 1. Several pairs of the damping and transformation systems 30, 32 may be disposed along each of the two pairs of parallel opposite walls of a typical (rectangular) building structure 1 and related foundation 2.

Figure 2:
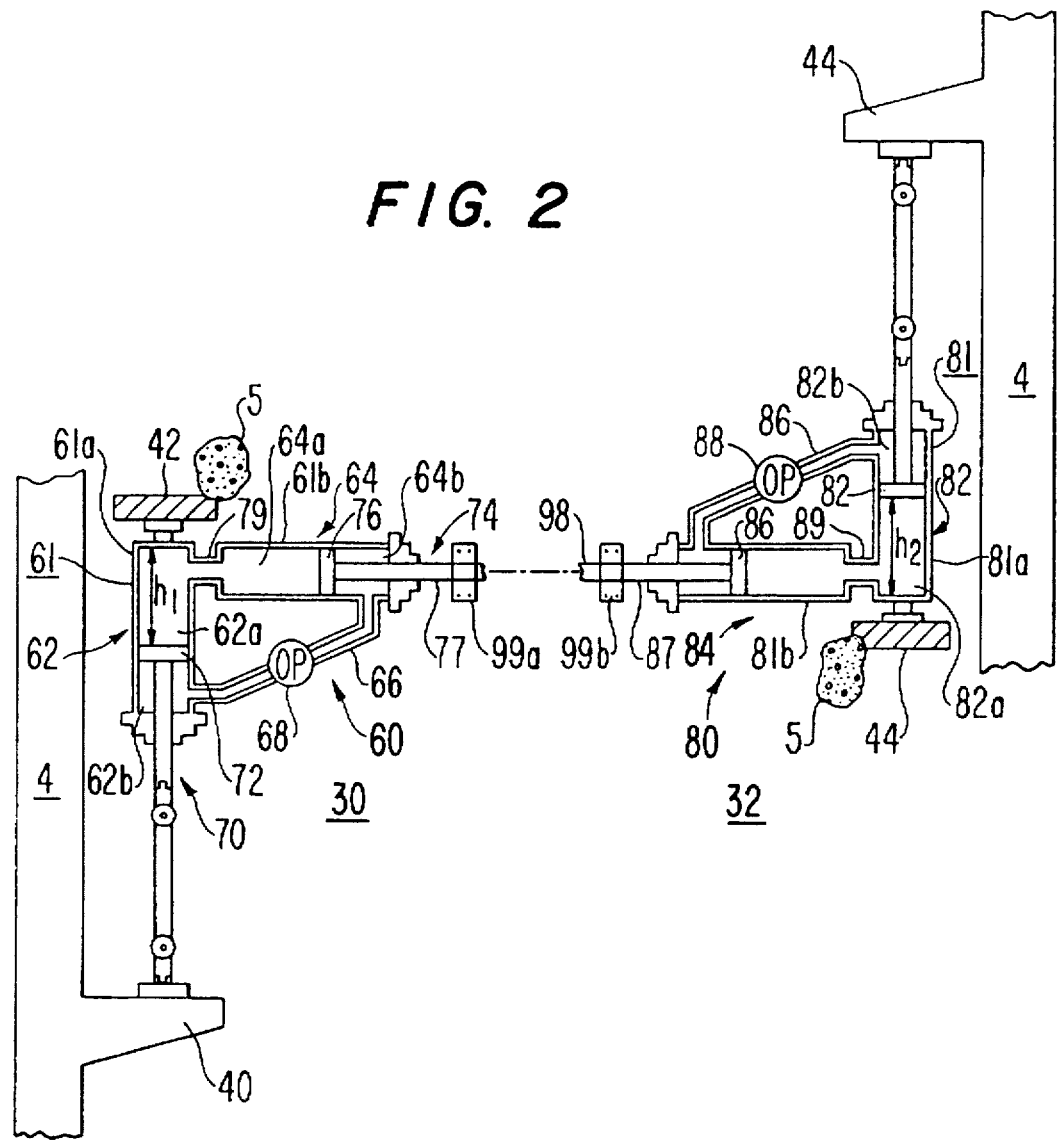
FIG. 2 is a fragmentary view, partially in cross-section, of a pair of damping and transformation units and their respective interconnections between a structure and its foundation according to a first embodiment of the present invention.

FIG. 2 illustrates a preferred form of the damping and transformation systems 30, 32 of FIG. 1 in accordance with a preferred embodiment of the present invention. More particularly, in FIG. 2, the first and second damping and transformation systems 30 and 32 are related as a pair, connected in relatively inverse (i.e., oppositely oriented) relationship between the structure 1 (represented by floor segments 5) by the respective brackets 42 and 44 and the corresponding opposite foundation walls 4 by the respective integral wall brackets 40 and 44.

The systems 30 and 32 comprise "L-shaped" dual hydraulic damper 60 and 80, the damper 60 (80) having a first chamber 62 (82) parallel to the associated foundation wall 4 and a second chamber 64 (84) oriented perpendicularly to the first chamber 62 (82) and the corresponding wall 4, and axially aligned with the (perpendicular) second chamber 84 of the associated second damper 80 of the pair of associated dampers 60 and 80 piston 70 in chamber 62 includes a head 72, moveable in sealed relationship with the corresponding cylindrical interior sidewall of the parallel chamber 62, which defines therein a first (adjacent) subchamber 62a and a second (remote) subchamber 62b. The second (perpendicular) chamber 64 likewise receives a piston 74 having a head 76 received in sealed, sliding engagement therewithin and defining a first (adjacent) subchamber 64a and a second (remote) subchamber 64b. The housing 61 of damper 60 includes a conduit 79 interconnecting the adjacent subchambers 62b and 64b such that they function effectively as a single L-shaped damper.

The remote subchambers 62b and 64b are interconnected by a conduit 66 including an orifice plug ("OP") 68 therein which is selected, as to the cross-sectional area, so as to afford the appropriate level of flow of hydraulic fluid therethrough and thus between the remote subchambers 62b and 64b upon movement of the piston 70, consistent with the desired damping characteristics. The orifice plugs are preferable to adjustable valves, since not susceptible of being misadjusted by unauthorized personnel—while, nevertheless, being readily replaceable so as to alter the flow rate and thus to adjust the damping characteristics.

In general, the level of damping is determined in accordance with known requirements relative to the parameters of the structure to be protected and the official regulation spectrum for the (geographic) environment of a given building and other related factors, as more fully explained in the '110 and '507 patents. The extent of damped linear movement permitted by the systems 30 and 32 is a function of the chosen fraction of the critical damping to be afforded thereby, relative to the amount of damping afforded by the base isolation system, under the effects of an earthquake, all as later discussed.

The systems 30 and 32 are interconnected by a shaft 98 connected through couplers 99a and 99b to the piston rods 77 and 87, respectively. Depending on the extent of damping to be afforded by the systems 30 and 32, the latter may transfer essentially very little or no force through the connecting shaft 98 (depending on the expected damping forces and the probability of eccentricity between the resultant of those damping forces and the gravity center of the isolated mass of the supported structure), but permit displacement of shaft 98 relatively to the systems 30 and 32 and thus corresponding displacements of the pistons interconnected thereby within the respective (perpendicular) chambers 64 and 84. Conversely, in the absence of an earthquake and while the structure remains immobilized against linear relative displacement by the disengaging devices (see the device 20 in FIG. 1), torsional movement resulting from an eccentric horizontal force applied to the structure (as produced, for example by the effects on wind on a building) is prevented. Thus, the systems 30 and 32 may transfer a force through the interconnecting shaft 98 which is a function of the moment caused by the eccentric force and also the distance between the piston rods and the connections thereof with the elements fixed to the ground, i.e., the integral wall brackets 40 and 44, for each pair of dampers.

The "L-shaped" dampers 60 and 80 thus function to transform a force or displacement having a direction parallel to the associated foundation wall 4 to a corresponding force or displacement perpendicular thereto and to perform the reverse transformation as well, hydraulically within each dual chamber damper structure. This permits for a convenient mechanical interconnection, such as by the shaft 98, of the associated dampers of a pair thereby to perform the requisite function of impeding rotation or gyration of the structure 1 relative to its foundation, i.e., maintaining $h_1+h_2$=constant. As before noted, appropriate selection of the orifice plug, moreover, permits individual and selective adjustment of the desired level of damping of lateral movement of the structure, relatively to the foundation, in a very direct and precise manner. The appropriate diameter of the orifice of the plug is determined empirically in a manner well known to those of skill in the art.

FIGS. 3A, 3B and 3C are planar, left elevational and right elevational views, respectively, of a damper 60, representing a practical embodiment of the L-shaped damper 60 shown in FIG. 2, common elements being shown by identical, but primed, reference numerals. In this practical embodiment, the housing 61' includes chambers 62' and 64' which are hydraulically interconnected and joined mechanically at right angles and thus in an L-shaped configuration by a corner connector 65. The connector 65 has a central bore 67 therein; an annular flange 69 disposed centrally within the bore 67 functions as a bearing seat for a bearing 71. An orifice plug assembly 68' is disposed centrally of the hydraulic conduit 66 joining the remote subchambers of the damper.

The orifice plug assembly 68' is shown in an enlarged view in FIG. 3D and in a first cross sectional view in FIG.

3E, in a plane taken along line 3E—3E in FIG. 3D perpendicular to the axis of the plug assembly and, further, in a longitudinal cross sectional view in FIG. 3F, taken in a plane along line 3F—3F in FIG. 3E. In FIG. 3D, the plug assembly 68' has a central bore 68a having an interior, annular threaded shoulder 68a1 therein, into which the orifice plug 75 is threaded, and an interior threaded portion 68a2 at the open end thereof, which receives a threaded plug (not shown) 75 for sealing the assembly. Orifice plug 75, as seen in FIGS. 3E and 3F, has a hexagonal recess 75a at a first end thereof for receiving a socket, drives by a socket wrench so as to be threaded into the interior, annular threaded shoulder 68a1 within the assembly 68' and a precision, centrally located axial bore 75b which connects a recess 75a to an enlarged bore 75c which extends to the opposite end of the plug 75. Side port 68a-3 connects conduit 66a to bore 75c and side port 68b connects conduit 66b to bore 75c. The central bore 75b has a diameter selected to permit only a specified level of fluid passage therethrough, thereby to produce the desired damping effect.

FIG. 3G is an exploded elevational view of a clevis assembly 53 which accommodates and anchors the corner bracket 55 of the damper 32' of FIGS. 3A–3F. Parallel upright walls 53a and 53b are joined by an integral base/mounting wall 53c and have respective, aligned bores 53a1 and 53b1 therein. A cylindrical shaft 55 having a threaded end 55a, an exposed shaft portion 55b and a bearing surface 55c is received through the bores 53b1 and 53a1, as stopped by head 55d; a cylindrical bearing 56 is received, in telescoping fashion, through the bore 53a1 and coaxially onto the shaft 55b, the threaded shaft end 55a projects through bore 53a-1 and is secured by a nut 57. The elements are so assembled with the corner plate 55 first positioned between the walls 53a and 53b and such that the bearing surface 55b is received in the bearing 71. The clevis assembly 53 thus provides for pivotal mounting of the damper 32', i.e., to allow partial rotational movement thereof, about the common axis of shaft 55 and bearing 71. Screw holes 53c1 and 53c2 provide for mounting the clevis assembly 53 on a suitable surface, as hereinafter discussed.

Figure 4:
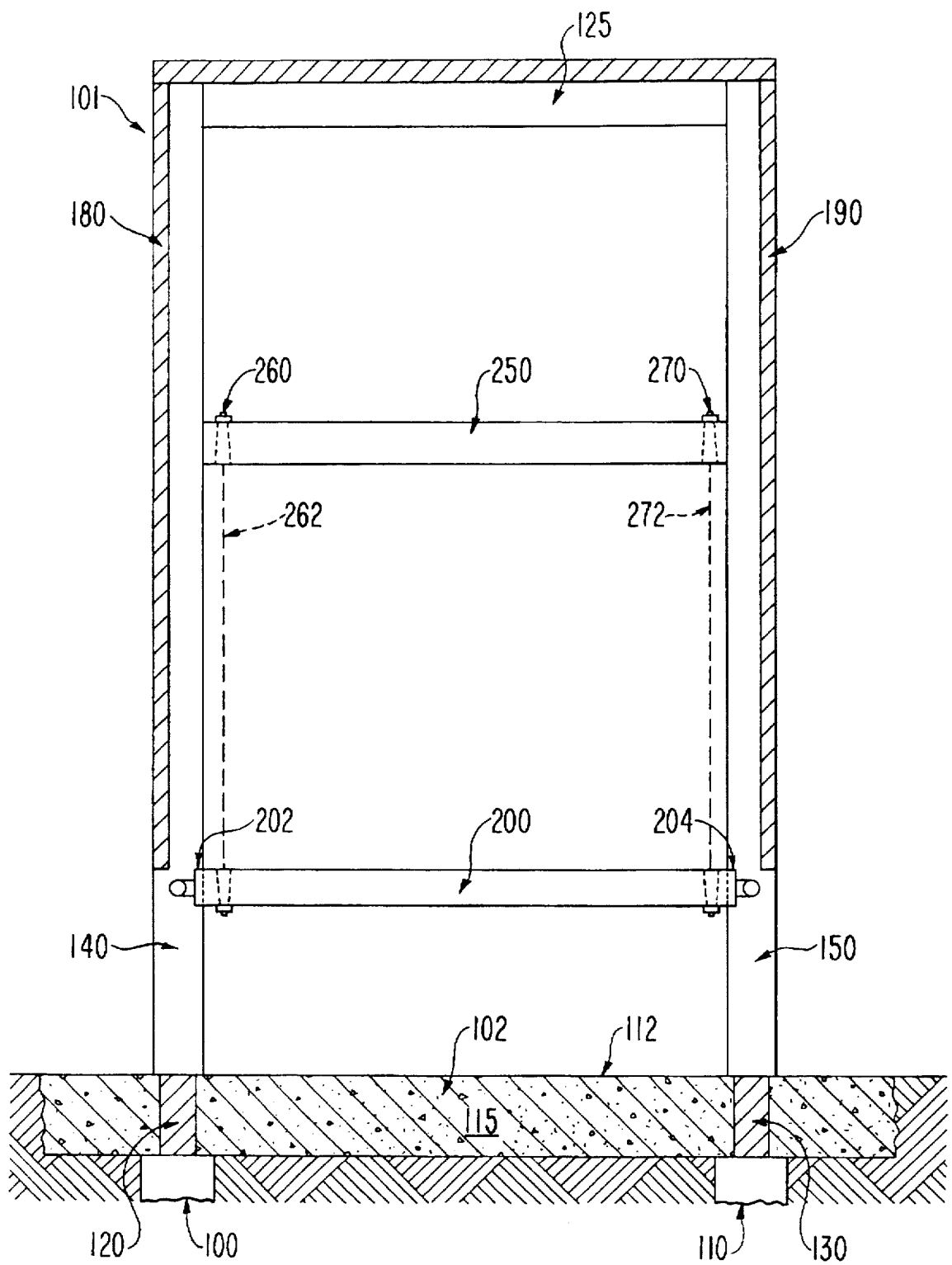
FIG. 4 is a schematic, end elevational view of a non-isolated building (support frame) structure incorporating a load-bearing slab and a pendulum-type base isolation and hydraulic damping system for the slab.

FIGS. 4 and 5 are end elevational and top planar illustrations, respectively, of a non-isolated building/support structure 101, incorporating therein a slab 200 supported in accordance with the pendulum-type base isolation and damping system of a second embodiment of the invention, but which utilizes features of the embodiment of FIGS. 1 to 3. FIG. 6 is a longitudinal cross-sectional view taken in a plane along the line 6—6 in FIG. 5. FIGS. 7A, 7B and 7C, moreover, are cross-sectional views of the slab 200 and segments of the longitudinal walls 180, 190 of the support structure 101, in vertical planes taken along the lines 7A—7A, 7B—7B and 7C—7C, respectively, in FIG. 5. Reference will be made concurrently to these figures in the following discussion of this second embodiment.

The slab 200 may serve as a platform, or support, for equipment to be protected from seismic disturbances. A practical embodiment of the invention, as an example, has been employed in a newspaper building in Mexico city, Mexico to support and protect a commercial high speed printing press. Because of the generally elongated configuration of such printing presses, the support slab 200 is correspondingly long and narrow and must be supported, not only so as to be isolated from movement under the conditions of the largest earthquake that normally can be expected in the relevant geographic region but also so that the slab not undergo torsional motion, a particularly critical characteristic in view of the long and narrow geometric configuration of the slab; as well, the slab must remain level for proper operation of the printing press. Thus, the base support must accommodate a level monitoring system for monitoring, and detecting, differential changes in the level of the slab and a mechanism for correcting for any such detected level differentials.

These conditions are especially important in an environment such as that of Mexico City, Mexico in which large differential settlements are common. For example, in that environment and for a base isolation system supported on a system of piles, as disclosed herein, differential settlements of the piles, which may be reflected in differential height changes of the vertical support columns 140 and 150, of up to 2 cm, can be expected. The need for correction is critical, especially for the specific embodiment of supporting the commercial high speed printing press, for which the manufacturer specifies a maximum height differential of the supporting structure of 0.003". It will be appreciated in this regard that the building, in which the slab having the equipment thereon is supported in accordance with the present embodiment of the invention, instead (or in addition) may itself be protected through a base isolation and damping system as in the preceding embodiment of FIG. 1.

As shown in FIG. 4, a non-isolated building 101, or at least a support frame portion thereof, is constructed on conventional pilings 100, 110 are arranged, in conventional fashion, in laterally spaced parallel rows, extending in a first direction (e.g., longitudinally) of the structure to be supported. Foundation support beams 120, 130 (FIG. 4) extend longitudinally along the parallel rows of, and are supported by, the pilings 100, 110, respectively. Lateral support beams 115 extend transversely between, and are rigidly interconnected at their opposite ends to, the spaced, parallel longitudinal support beams 120, 130. A concrete slab floor 112 then is formed on and supported by the support beams 115, 120, 130, in conventional fashion. Parallel spaced rows of paired vertical support columns 140 and 150, which may be made of steel-reinforced concrete, are supported at the lower extremities thereof on the beams 120 and 130, respectively, and are interconnected at the upper extremities thereof by lateral (i.e., transverse) ceiling beams 125, typically steel I-beams.

As better seen in FIG. 5, the vertical support columns 140 of FIG. 4 represent plural such columns 140a, 140b, 140c, . . . 140n spaced along a first longitudinal side of the structure 101 and the vertical support columns 150 of FIG. 4 similarly correspond to plural such columns 150a, 150b, 150c . . . 150n positioned in spaced relationship along a second longitudinal edge of the building structure 101 in paired relationship with the columns 140a, 140b, 140c . . . 140n, respectively. A first longitudinal wall 180 is supported on the vertical support columns 140 and a parallel, second longitudinal wall 190 is supported on the vertical support columns 150 along the second longitudinal edge of the building 101. The walls 180, 190 may extend to the floor 112 and, further, may include access openings for egress and ingress therethrough, between the area under the slab 200 and areas within the building structure 101 on opposite sides of the walls 180, 190. In the installation for the printing press, above referenced, the space under the slab 200 is employed for automobile parking.

The reinforced concrete support slab 200 is held in an elevated position within the structure 101 by a pendulum-type base isolation system comprising plural first pendulum supports 260 and plural second pendulum supports 270 (only one of each shown in FIG. 4), connected at the upper ends thereof to the plural vertical support columns 140 and 150, respectively, and at the lower ends thereof to spaced positions along the respective, opposite longitudinal edges of the support slab 200. For the example herein illustrated, the two maximum orthogonal (i.e., X-and Y- components) of the relative horizontal displacement(s) resulting from a maximum seismic disturbance are expected to be close to 10 inches; thus, a 14 inch wide gap is established around the entire periphery of the slab 200 to the surrounding elements (i.e., the columns 140 and 150 as well as the walls 180 and 190, etc. of the structure 101) to allow for such a maximum horizontal displacement of the slab 200.

As best seen in the planar view of FIG. 5, the slab 200 has parallel longitudinal edges 202, 204 which include successive indentions, or recesses, 202b, 202c, . . . and 204b, 204c . . . which are disposed symmetrically about and spaced from the respective support columns 140b, 140c, . . . and 150b, 150c, . . . by substantially the same spacing (14 inches) as between the interior surfaces of the walls 180, 190 and the longitudinal edges 202, 204 of slab 200.

The slab 200, as shown in more detail in FIGS. 5–7, is made of reinforced concrete so as to include monolithically integrated reinforcement beams of a similar material. The integral support beams include longitudinal, outer support beams 220 and 230, inner support beams 222 and 232 and plural transverse support beams 215a, 215b, 215c, . . . 215n which extend between and integrally interconnect the outer and inner longitudinal support beams 220, 230 and 222, 232. In addition to being designed to withstand the vertical loading of the equipment positioned thereon, the slab is also designed to have considerable stiffness for minimizing differential vertical displacements. The slab also is designed to have a mass much larger than that of the equipment mounted thereon so that the slab, including the equipment, may be considered as a unitary rigid body for purposes of dynamic analysis. The large mass also assists in minimizing vibration, which could result from regular operation of the equipment or its start-up or sudden stopping, to an imperceptible level.

The slab 200, moreover, is reinforced at the pairs of corner portions 202b1 and 202b2, 202c1 and 202c2 . . . along the first longitudinal edge and corner portions 204b1 and 204b2, 204c1 and 204c2, . . . along the second longitudinal edge adjacent the respective recesses therein, and thus symmetrically relatively to the respective support columns, for receiving the distal (i.e., lower) ends of pendulums 262, 272 of the associated pendulum support systems 260, 270 (FIG. 4), as later described. As illustrated schematically in FIG. 4, transversal steel beams 250 extend between, and are connected at their respective opposite ends to, the corresponding pairs of vertical support columns 140 and 150 at an intermediate height position of the respective vertical support columns 140, 150. Pendulum support systems 260, 270 are secured to the junctions, or interconnections, of the respective, opposite ends of each transversal beam 250 and the associated vertical support columns 140 and 150 (only one such beam 250 and associated pair of vertical support columns 140 and 150 being shown in FIG. 4).

Each pendulum support system 260 (270) includes a pair of pendulum-type suspension rods 262-1 and 262-2 (272-1 and 272-2); only a single such pendulum rod 262 (272) of the pair thereof for each system 260 (270) is illustrated in FIG. 4, extending to and the distal end thereof being received in the corresponding, reinforced corner connection portion in the slab 200, along the respective longitudinal edge 202 (204). As shown in FIG. 5, these connection portions are formed in the reinforced corner portions of the recesses in the longitudinal edges of the slab 200 adjacent the respective support columns—for example, in the reinforced corner portions 202b1 and 202b2 of the recess 202b adjacent the column 140b.

FIGS. 8A through 8C illustrate a representative transversal steel beam 250 and its interconnection, at one end, to a corresponding vertical support column 140. Diagonal support bars 264-1 and 264-2 extend symmetrically from the beam 250 to a longitudinal support beam 142 (FIG. 8A). A pair of pendulum rods 262-1 and 262-2 extend from the bars 264-1 and 264-2 downwardly, in symmetrically spaced and parallel relationship.

As best seen in FIGS. 8A and 8B, the pendulum rods 262-1 and 262-2 are identical and each may comprise a 4 inch diameter steel rod. With reference to the rod 262-2, an aperture seating plate 265-2 is received on the diagonal support beam 264-2 and the upper threaded end of the rod 262-2 is inserted therethrough and held in position by a nut 266-2. The opposite, lower end of rod 262-2 (FIG. 8C) extends through an aperture in a lower seating plate 267-2 and is of an enlarged, hemispherical shape having a radius greater than that of the rod, i.e., knuckel element which is received in a socket 268-2 having a mating interior configuration to form a so-called knuckle joint for pivotally interconnecting the rod to the slab 200 as shown in FIG. 8B, the upper portion of the rod also includes a similar knuckle joint. The mating surfaces preferably are designed to function as a frictional damper and thus for producing a part of the damping of the linear movement of the slab relatively to the supporting pendulum rods (and, correspondingly, to the support frame and the earth) in the event of a seismic disturbance.

The pendulum support systems 260, 270 are designed to have the appropriate pendulum arm length considering the characteristics of the relevant geographic area. As taught in the prior patents, the length of the pendulum should be proportionate to at least a natural period 2.5 times larger than the expected dominant period of the ground. By this provision and with the addition of proper damping, in most cases the horizontal acceleration produced by a seismic disturbance can be reduced by approximately 90%.

To facilitate initial assembly and also for later adjustment purposes, the upper, threaded ends of the pendulum support rods may be engaged and raised, relatively to the associated one of the pendulum support systems 260, 270; the upper mechanical nuts, such as 266-2, then may be driven in rotation by the appropriate extent, thereby to raise or lower the associated rod relatively to the support systems 260, 270 and correspondingly to raise or lower the slab in the portion supported on the lower distal end of the rod. Moreover, and as discussed hereafter, the present invention provides for monitoring the level of the suspended slab at the positions along the edges thereof at which the lower distal ends of the rods are connected in order to detect differential vertical displacements that could be caused by differential settlement of the foundation on which the support columns are mounted. Any detected height differentials are then corrected by rotating the nuts and thereby adjusting the relative heights of the associated pendulum rods, in the described manner.

The damping system 300 preferably is located substantially entirely on the underside (i.e., beneath the lower surface of) the slab 200 and comprises a first system 310 having mirror image subsystems 310A and 310B and a second system 320 having mirror image subsystems 320A and 320B. As in the systems of the above, prior patents, the first system 310 functions as an orthogonal system relative to the second system 320, even though both are connected only to the longitudinal edges of the slab and correspondingly anchored to the earth only along longitudinal foundation supports. The reason therefor is to permit the slab 200 to be increased in length at a subsequent time, e.g., to accommodate a future installation of additional, or larger, equipment. This capability is afforded by the strategic placement and mounting of the L-shaped dampers of the hydraulic damping and force transformation system and the associated mounting structures therefore, in accordance with the invention, which prevent any transverse forces from acting on the piston rods of the hydraulic dampers and which could tend to bend or otherwise distort or damage same and thereby to impede or destroy the operability of the damping subsystem.

Since the subsystems 310A and 310B are substantially identical, only the subsystem 310A is described in detail in the following. The subsystem 310A includes a first mount assembly 311A connected to the frame support structure 101, illustratively to the wall 180. A lateral connecting link 312A extends from the mount assembly 311A and is coupled through a through-hole connector assembly 313A, extending through the integral support beam 220, to a first (transverse, or lateral) piston rod of an L-shaped hydraulic damping and transformation unit 314A which is securely mounted to the slab 200; a second (longitudinal) piston rod of unit 314A then is coupled to a longitudinal link 315A which extends through bearings in the transverse beams 215A, 215B, . . . substantially for the entire length of the slab 200, to a (longitudinal) piston rod of a mating L-shaped hydraulic damping and transformation unit 316A, a second (lateral, or transverse) piston rod thereof being connected through a lateral linkage 317A, in turn, coupled through a through-hole connector assembly 318A, extending through the longitudinal, outer support beam 230, and to a second hydraulic damping and mount assembly 319A connected to the opposite wall 190. The subsystem 310B is in a mirror-image relationship to the subsystem 310A and includes respectively corresponding elements 311B through 319B.

In FIG. 5, the second system 320, as noted, includes mirror image subsystems 320A and 320B which are identical, but for their location and mirror image orientations, and thus are described in detail only in relation to subsystem 320A. A first mount 321A is affixed to the wall 180; connected thereto is a longitudinal piston rod of an L-shaped damper and force transformation unit 322A which is connected to the slab 200 and which has a second (transverse, or lateral) piston rod connected to a lateral link 323A. A second L-shaped damping and transformation unit 324A, mounted to the opposite longitudinal edge of the slab 200, includes a lateral piston rod connected to the link 323A and a longitudinal piston rod connected to a second mount 325A. The subsystem 320B includes respectively corresponding elements 321B-329B.

FIG. 6 is a vertical cross-sectional view taken in a longitudinal plane along the line 6—6 in FIG. 5. FIG. 6 illustrates schematically the subsystem 310A, including the longitudinal link 315A interconnecting the damper unit 314A at the left in the figure to the damper unit 316A at the right of the figure and also, at the left of the figure, illustrating the vertically-spaced damper unit 314B of the mirror-subsystem 310B.

FIGS. 7A, 7B and 7C are vertical cross-sectional views taken in planes along the lines 7A—7A, 7B—7B and 7C—7C, respectively, in FIG. 5. FIG. 7A thus shows the laterally (transversely) extending portions of the mirror-related subsystems 310A and 310B and, particularly, illustrates somewhat more clearly the vertical displacement of the subsystems 310A and 310B, above-described. Further, proceeding from FIG. 7A to FIG. 7C, the system 310a may be seen to extend from the wall 180 (at the left end in FIG. 5) laterally to the wall 190 (at the right end of FIG. 5). The subsystem 310B, as a mirror image, proceeds in the opposite direction from FIG. 7A to 7C.

As explained in relation to FIGS. 9A–11C, below, the mount assemblies, which connect the various damping and transformation units either to the slab or to the wall, are designed so as to permit relative vertical, lateral and longitudinal movement to occur between slab 200 and the supports 180, 190, without resulting in damaging forces acting on the damping and transformation units and, particularly, on the piston rods thereof, such as would cause binding and/or damage thereto, preventing the proper operation of the system. As will become clear from the following discussion, the system, in addition to providing suitable damping to the linear relative displacements, impedes the action of forces tending to produce relative rotation between the isolated structure and elements fixed to the ground, and thus movement of the slab 200 relative to the vertical support columns 140, 150 and related walls 180, 190; in this regard, the 14 inch gap surrounding the slab 200 is designed to allow that predicted, maximum extent of relative movement in each of these orthogonal directions; the associated mounts likewise must accommodate that extent of freedom of movement.

Figure 9A:
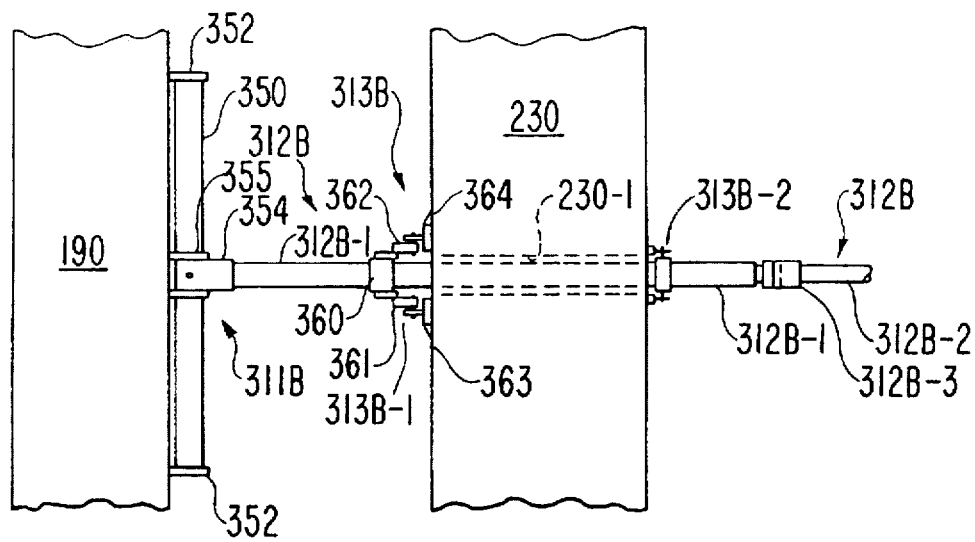
FIGS. 9A, 9B and 9C are fragmentary and cross-sectional views of a mount and connecting link assembly associated with a first damping and transformation unit, FIGS. 9A and 9B being planar and vertical cross-sectional views, and FIG. 9C being an enlargement of a portion of FIG. 9B, respectively.
Figure 9B:
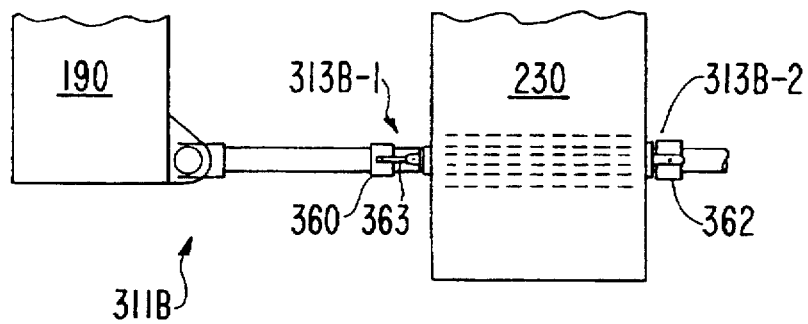
Figure 9C:
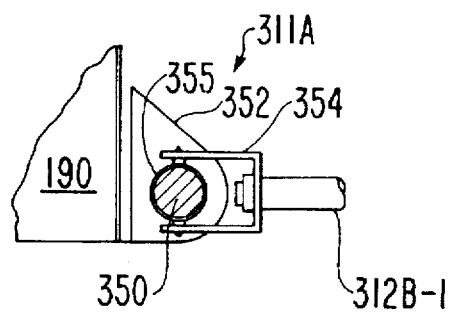

FIGS. 9A and 9B are planar and vertical cross sectional views, the latter corresponding to a left-hand portion of FIG. 7A and the former corresponding to an enlargement of the planar view of the mount assembly 311B, link 312B and through-hole assembly 313B. FIG. 9C is an enlargement of the mount assembly 311B. In all three figures, a portion of the concrete wall 190 is evident. FIGS. 9A and 9B also illustrating segments of the perimeter support beam 230 (which, in the view of FIG. 5, underlies but is integral with the horizontal slab 200).

The mount assembly 311B comprises a cylindrical shaft 350 mounted by a pair of brackets 352 at the opposite ends thereof so as to be spaced from but parallel to the wall 190. A connecting bracket 354 is supported by a bearing 355 on the shaft 350 and is free to move axially there along and to rotate thereabout. Link 312B includes a first portion 312B-1, which is connected at one end to the bracket 354 and extends through a through-hole connector assembly 313B and a through-hole 230-1 in the beam 230, exiting through the opposite side thereof, and a second portion 312 B-2 connected by several (differential) coupling 312B-3 to the first portion 312B-1.

The connector assembly 313B includes a first portion 313B-1 and a second portion 313B-2 on the outer and inner sidewalls, respectively, of the beam 230; while different in size and proportions, they are effectively the same in structure and function; accordingly, only the unit 313B-1 is described in detail. A cylindrical bearing 360 is received on the cylindrical link portion 312B-1; a pair of support arms 361, 362 are pivotally connected at first ends to the bearing 360 and at second ends to respective brackets 363, 364 in turn connected to the beam 230. The combination of the pivotal connecting mount assembly 311B along with the pivotal connectors 313B-1 and 313B-2, permit for both vertical and longitudinal, free differential displacements of the beam 230 and the wall 190 while supporting the link 312B-1, for assuring unrestricted axial movement thereof responsive to lateral differential displacement of the beam 230 and the wall 190. As before noted, the axial sliding of bracket 354 by virtue of bearing 355 on the shaft 350 allows for up to the required 14 inches of movement, in either longitudinal direction, of the beam 230 relatively to the wall 190; moreover, the pivotal, or rotating, freedom of mounting assemblies 311B and 313B-1, 313B-2, and the axial freedom of the latter permit for the vertical differential displacement of typically less than one inch.

Figure 10A:
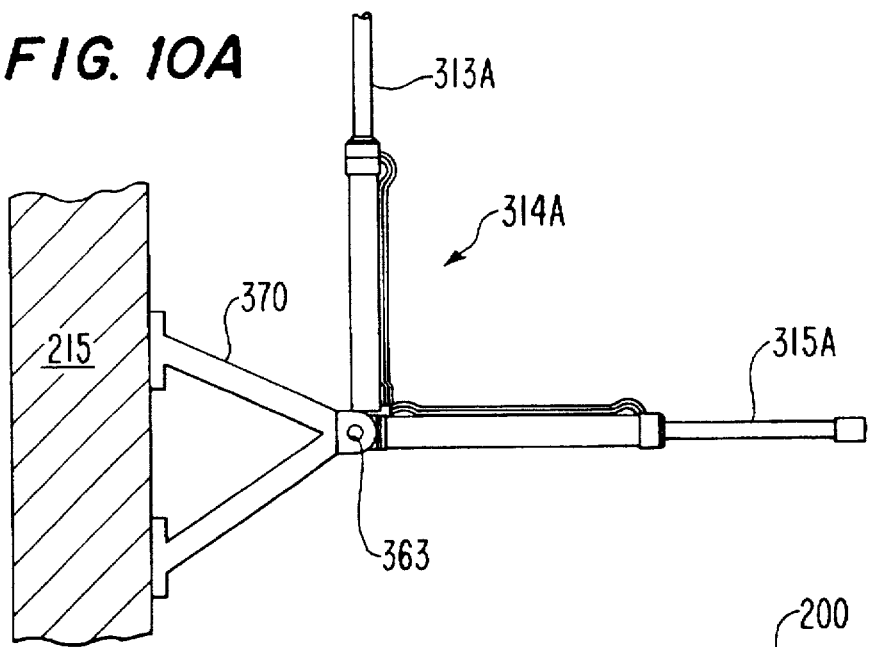
FIG. 10A is a fragmentary planar view and FIG. 10B is a fragmentary side elevational view, both partially in cross section and on an enlarged scale, of the damping and transformation unit of the first type, associated with the mount and connecting link assembly of FIGS. 9A–9C.
Figure 10B:
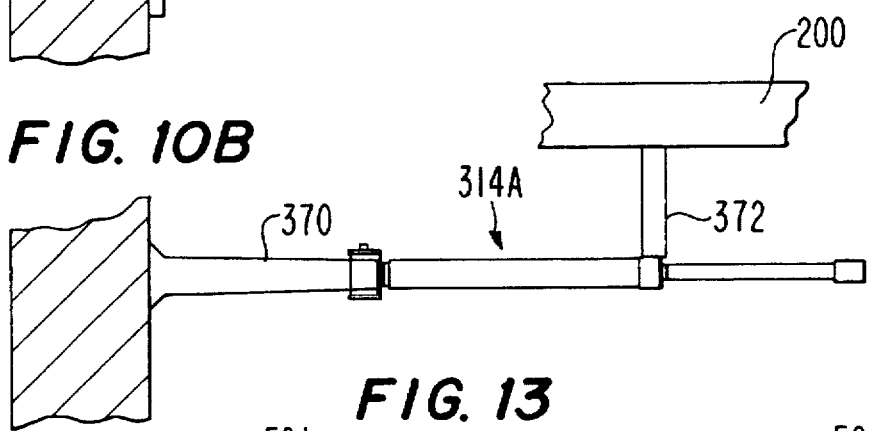

FIGS. 10A and 10B illustrate plan and vertical elevational views of the L-shaped damper 314A, which interconnects the links 312A and 315A to effect force and/or displacement transformation from lateral to longitudinal directions and the reverse; as will readily be understood, damper 314B (FIG. 5) is the mirror image of damper 314A and would connect directly to the link 313B-2 in FIGS. 9A to 9C. The damper 314A is mounted by the associated clevis assembly 263, shown in FIG. 3B, to a bracket 370 which in turn is connected to a vertical side wall of a lateral support beam 215 of the slab 200 (FIG. 5).

FIG. 10B, moreover, illustrates a bracket 372 which is affixed to the (horizontal) undersurface of the slab 200 to provide vertical suspension support for the damper 314A.

The damper and transformation unit 314A and the mounting thereof as shown in FIGS. 10A and 10B are the same as that employed for the corresponding units 314B, 316A and 316B (see FIG. 5). Further, it will be understood that these damper and transformation units, in addition to providing suitable damping to the linear relative displacements, impede the action of forces tending to produce relative rotation between the isolated structure and the elements fixed to the ground.

FIGS. 11A, 11B and 11C illustrate the damping and transformation unit 324B with its associated mount assembly 325B as seen schematically in the left portion of FIG. 7B, a vertical cross-section corresponding to FIG. 11B. The integral beam 230 of the slab 200 is shown in FIGS. 11A and 11B; however, the wall 190 in FIG. 11B is deleted from FIG. 11A for clarity of illustration. FIG. 11C illustrates a portion of the slab 200, but not the beam 230 nor the wall 190. Further, in FIG. 11A, unit 324B is schematically indicated to be connected by clevis assembly 63 thereby to the slab 200 which, of course, is integral with the beam 230.

In FIG. 11A, the mount assembly 325B includes an extension arm 390 secured by a pair of bearings 392 to a rod 393, the rod 393 being journaled at its opposite ends to respective brackets 394 secured to the beam 230. The bearings 392 permit both pivotal, or rotational, and axial sliding movement of the arms 390 relatively to the rod 393. In FIG. 11B, the arms 390 are connected to a pivotal coupling 396 secured on a bearing 397 which is free to slide axially on a cylindrical shaft 398, mounted at its opposite ends to a bracket 399 in turn secured to the wall 190. (In FIG. 11A, the wall 190 is indicated schematically as connected to the bracket arm 399 for the shaft 398.) This composite arrangement affords freedom of movement for both relative height displacements between the beam 230 (and thus slab 200) and the wall 190 (and associated supports in the ground) as best seen in FIG. 11B, and for lateral displacements between the slab 200 and its associated beam 230, relatively to the wall 190, by sliding movement of bracket 397 on the shaft 398, and thus without imparting transverse forces on the piston rod of the L-shaped damper mechanism 324B (as will be appreciated from FIGS. 11A and 11C)—while nevertheless permitting differential longitudinal forces and/or force (in either longitudinal direction) to be conveyed to the piston rod of damper 324B. The L-shaped damper 324b is mounted by a clevis assembly 402 and bracket 404 to the slab 200.

FIGS. 12A–12C provide a somewhat simplified alternative embodiment for mounting the unit 324B of FIGS. 11A–11C, identical parts being identified by the identical numerals and similar parts being identified by identical, but primed, numerals.

With concurrent reference to FIGS. 12A–12C, a pair of brackets 394' are mounted on beam 230 and support the free ends of a V-related pair of rods 390' for pivotal movement. The apex of the V-related pair of rods 390' is connected to a bearing 391 which is received on the piston rod 70'. The free end of the piston rod 70' is pinned to a bearing 397' which is received on a rod 398' connected at opposite ends to the support wall 190. As in the structure of FIGS. 11A–11C, this mounting arrangement permits relative vertical displacement, as between the slab 200 and the adjacent support wall 190, due to the pivotal mounting of the support arms 390' (see FIG. 12C) and for damped, relative longitudinal movement between the slab 200 and the support wall 190. A further bracket 404 supports the unit 324B from the bottom surface of the slab 200. The structure of FIGS. 12A–12C will be seen to have fewer parts and a simpler construction relative to that of FIGS. 11A–11C, while affording the same functions.

Figure 13:
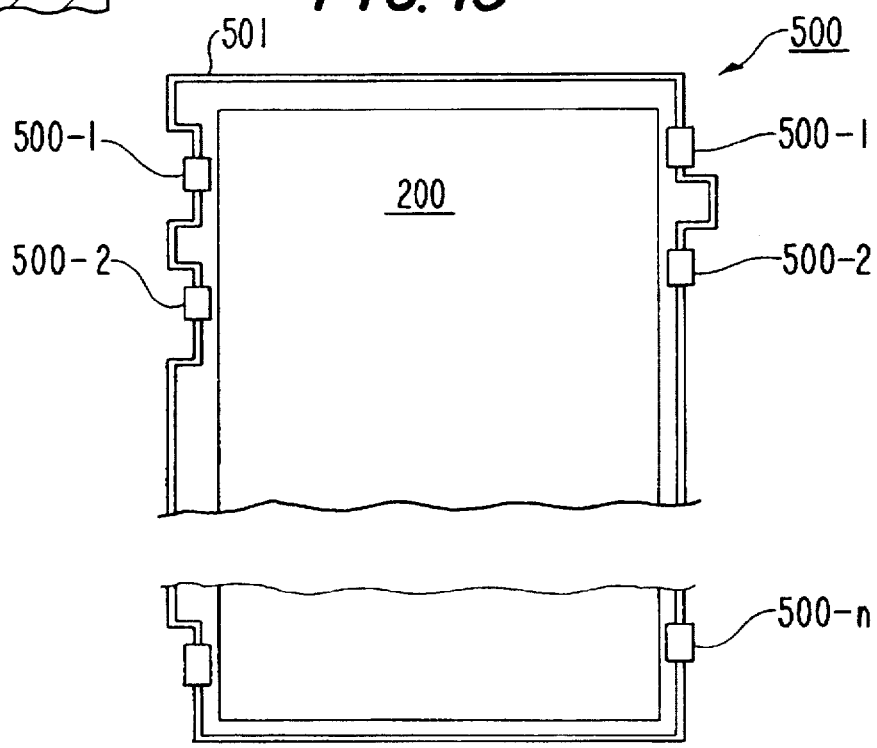
FIG. 13 is a schematic of a level monitoring system for monitoring relative height positions, and detecting any differential vertical displacements, at spaced positions along the slab at which the pendulum type support rods are connected.

FIG. 13 is a schematic of a level monitoring system 500 which monitors differential height variations at each pendulum support connection position on the slab 200. Particularly, sensors 500-1, 500-2, 500-n are mounted in respective, appropriate sensing locations, later discussed, adjacent corresponding interconnection positions of the slab to the vertical support columns of the pendular support system. A fluid conduit 501, which may be a copper pipe or suitable reinforced hydraulic hose, extends about the perimeter of the support slab interconnecting, effectively in a series fluid connection, all of the sensor stations 500-1, 500-2, ... 500-n.

Figure 14:
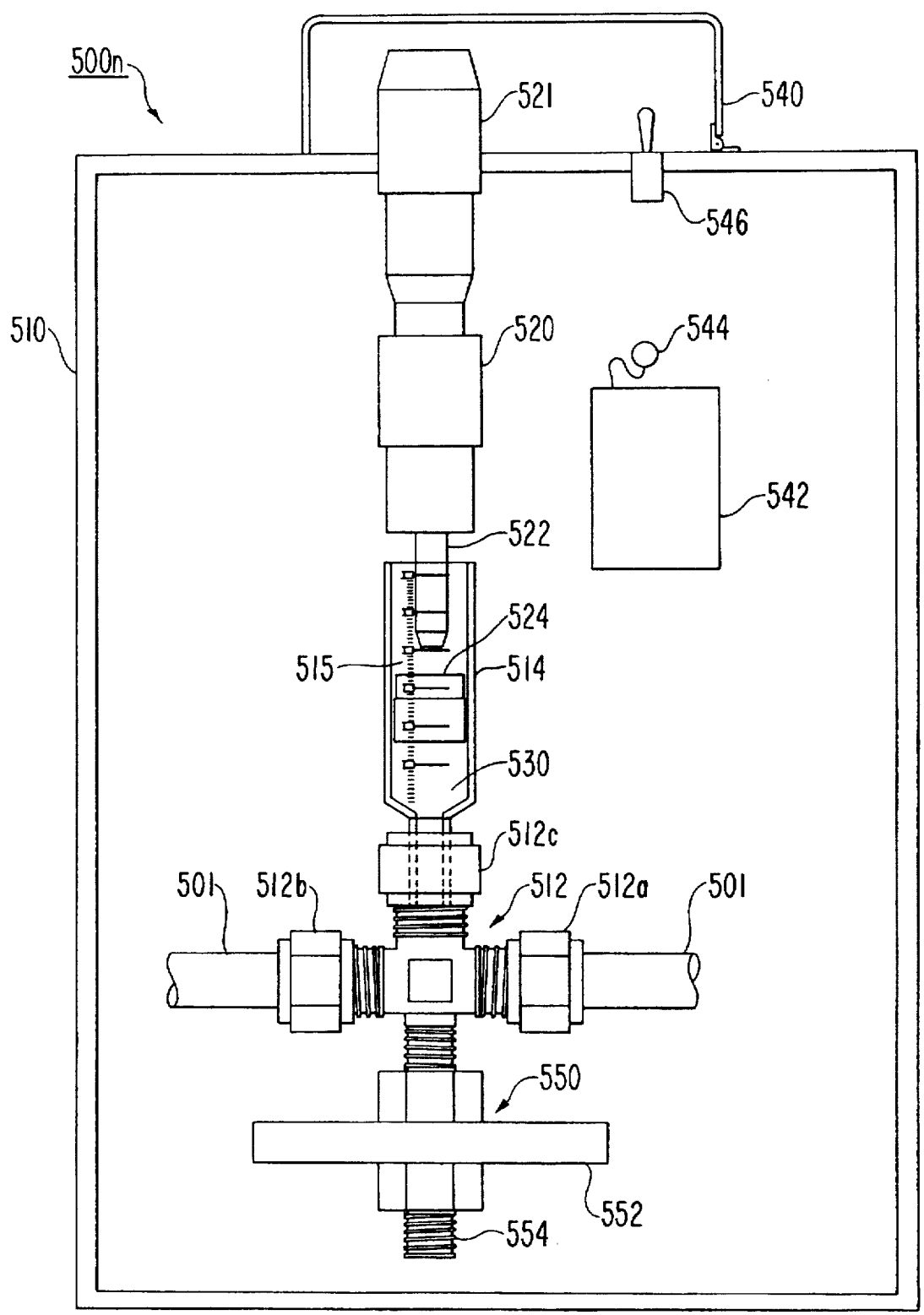
FIG. 14 illustrates an individual sensor stage at each of the support positions as indicated in FIG. 13.

FIG. 14 is a schematic illustration of a sensor station 500, representative of each of the stations 500-1 to 500-n. A housing 510 has mounted securely thereon a T-shaped fluid coupler 512, having aligned couplers 512a and 512b through which the perimeter conduit 501 is connected and a transverse coupler 512c to which a crystal test tube 514 is attached. The crystal test tube 514 has a graduated scale 515 thereon.

An analog micrometer 520 (which instead could be digital) is mounted to the housing 510, the measurement probe 522 thereof extending axially inwardly of the crystal test tube 514. A mount 550 supports the micrometer 520 and related hose connections on the housing 510. Particularly, a plate 552 is secured to the housing 510 and a threaded shaft 554 is secured above and below the plate 552 by a pair of nuts 555 and 556. The nuts 555 and 556 may be rotated in either a common clockwise or a common counter clockwise direction to correspondingly lower or raise the micrometer relatively to the plate 552.

Liquid mercury 530 is supplied to the system, filling the conduit 501 and extending upwardly into each of the crystal test tubes 514. In this regard, the coupling units 512 are positioned on the perimeter of the slab at common respective elevations so that the mercury 530, which seeks a common level, has an exposed surface at approximately the same position on the respective graduated scales 515 of all test tubes 514, at all of the respective sensor stations 500-1 to 500-n. A stainless steel cylinder of approximately ¾" height is inserted in the tube 514, so as to float on the mercury 530, the upper end surface providing a target surface for the probe 522 of the micrometer 520. The micrometer 520 then is adjusted in height and effectively calibrated, by rotation of the nuts 555 and 556, so as to achieve substantially the identical height of mercury, measured relatively to the scale 515, at all of the stations.

An electrical circuit including a battery 542, a lamp or other alarm 544, a switch 546 and electrical contacts with the probe 522 and with the mercury 530 (all not shown) are provided so as to establish a series circuit of these elements, when the switch 546 is activated. The micrometer then is adjusted such that the probe 522 contacts the float 524 to complete the series circuit, whereupon the alarm (lamp) 544 is activated. The position of the float relative to the measured graduation 515 at that instant of contact then is noted and recorded. The data for all of the sensor stations is taken in this manner and recorded. (As an alternative, the probe 522 can be adjusted until contact is achieved and the light/alarm 540 activated; then, the micrometer can be backed off, just to the point where the light is deactivated, and the measurement taken.)

As will be understood, changes in conditions, particularly the ambient temperature, which affects all stations equally will result in a common variation in the measurements for all stations. On the other hand, differentials in the variations, as between one or more stations relatively to the others, is indicative of differential settlement and which then must be corrected.

In a practical, working embodiment of the invention, the system is effective for detecting deflections, or elevational differentials, of as little as 1/1000th of an inch (0.001 inches). Since this differential is precisely sensed and measured, the necessary extent of adjustment of the pendulum support at the affected sensor station likewise is known; furthermore, precise calibration of the height differential change produced by each rotation of the nut engaged on the upper distal end of the pendulum rod is also known. Accordingly, rotation of the nut through a precise angle to correct for the height differential affords a precise basis to realign the slab and maintain a uniform elevation throughout. Preferably, a hydraulic jack is used to raise the rods associated with stations at which a differential deflection is noted and the mechanical nut on each involved rod then is rotated through a previously determined angle (e.g., in a practical implementation, a rotation of 9° provides a 1000th of an inch height correction) to correct for the differential variation at the affected station.

In an initial installation, the vertical support columns preferably are provided with an inwardly extending, integral bracket onto which a steel plate is positioned and the slab then is loaded onto the steel plates and, in turn, supported on the brackets. Preferably, laser alignment devices are employed to assure that the slab is a planar condition at this juncture. The leveling system, preferably, is also already installed at this juncture. The equipment then is mounted on the slab, and the measurement system then is operated to detect any differentials in the height measurements. The slab is then raised slightly and the steel plates are removed, such that the slab is supported by the pendulum rods, and a final height differential check is performed using the system, with any adjustments made, as needed.

The monitoring and adjustment system, moreover, may be implemented in any desired degree of semiautomatic or fully automatic arrangement. For example, the illustrated manual micrometers may be replaced by electrical proximity detectors, such as commercially available linear variable differential transducers. Such a proximity probe may be, for example, a Bentley-Nevada Catalog No. 210505-00-20-30-02 employed with a conditioner which may be a Bentley-Nevada 7200 series proximator. As is well known, such probes employ a reflected laser beam for measuring distance variations, such as those which the stainless steel float 524 would undergo as a result of differential settlement and corresponding variations in the height of the mercury relative to the calibrated scale. The distance variations, or differentials, can be sampled periodically under computer control and compared.

In an actual implementation of the system of the invention, as hereinabove disclosed, various tests were conducted to asses operability and important characteristics of the system.

Figure 15:
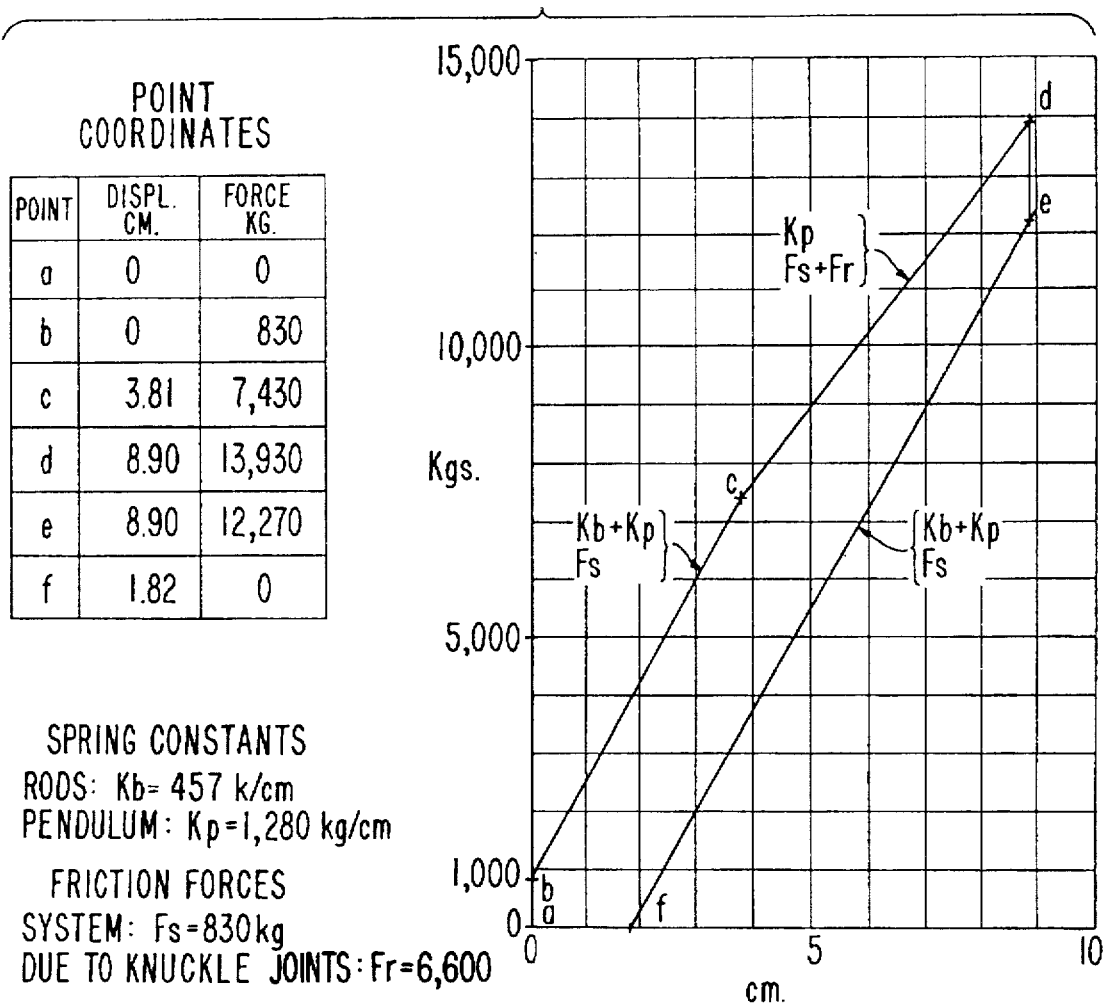
FIG. 15 is a force-displacement diagram of the suspended slab, based on measurements recorded during physical testing.

Force-displacement tests were performed by using a hydraulic jack coupled with a digital manometer of high precision, thereby to slowly displace the suspended slab, successively, in the East-West and in the North-South directions. The forces were calculated from the hydraulic pressure readings of the hydraulic jack. Force-Displacement measurements are shown in FIG. 15, from which the following conclusions and data were derived:

a. The Force-Displacement diagram exhibits trilineal behavior of the system.

b. The initial friction force provided by the damping system and the sliding plates disposed to cover the gaps at the edges of the slab is Fs=830 Kg.

c. The necessary horizontal force applied at the level of the slab to overcome the dynamic friction of the knuckles joints of the support rods is Fr=6,600 Kg.

d. The displacement of the suspended slab from the initial rest condition, at the moment when the dynamic friction of the knuckle joints is overcome under the horizontal force previously indicated, is x=3.81 cm.

e. The flexure spring constant of all 24 pendulum support rods (i.e., in the actual system and as shown in FIG. 5), together, is Kb=457 Kg/cm.

f. The spring constant of the pendulum is Kp=1280 kg/cm.

g. The total weight of the system was checked by multiplying the length of the rods (measured from the centers of gyration of the knuckles) by the spring constant of the pendulum, resulting in W=1,198,080 Kg. Considering the average vertical load per rod, the rod length and diameter and the modulus of elasticity of the steel, a study was developed by means of numeric integration to check the results indicated in the above paragraphs "c" and "d". From these results, the coefficient of dynamic friction on the knuckle joints was found to be ρ=5.3%.

Tests were also conducted to measure the displacement of the slab due to torsional motion, involving the functioning of the special L-shaped dampers which, as before-noted, afford both damping of linear relative displacements as well as impeding the action of forces tending to produce relative rotation (i.e., the "anti-turn system"). Particularly, it was important to verify if the linear displacements at the extreme North and South ends of the slab (i.e., in the longer dimension), caused by a possible rotational moment, were those due exclusively to the elasticity of the components of the damping system. This was confirmed after applying a torsional moment of 91,900 Kg·M and determining that the linear displacements on the North and South extremes of he slab were only approx. 0.9 cm. as expected.

The damping force provided by the special dampers, can be expressed as:

$$F(t) = a\dot{u}(t)^b$$

where "a" and "b" are constants, experimentally determined for the actual implementation of the system of the invention to have values of 18.75 Kg.Sec./cm. and 1.77, respectively. These values were determined through Velocity-Damping Force tests performed prior to the installation of the dampers, using different diameters for the orifices in the plugs, resulting in selecting orifice diameters sufficient to produce a damping force which, when added to the frictional damping forces of the knuckles of the pendulum support rods, afforded a linear viscous damping of approximately 20% of the critical damping, for the suspended slab and equipment mounted thereon, at the expected maximum relative velocity resultant from a maximum seismic disturbance.

Figure 16:
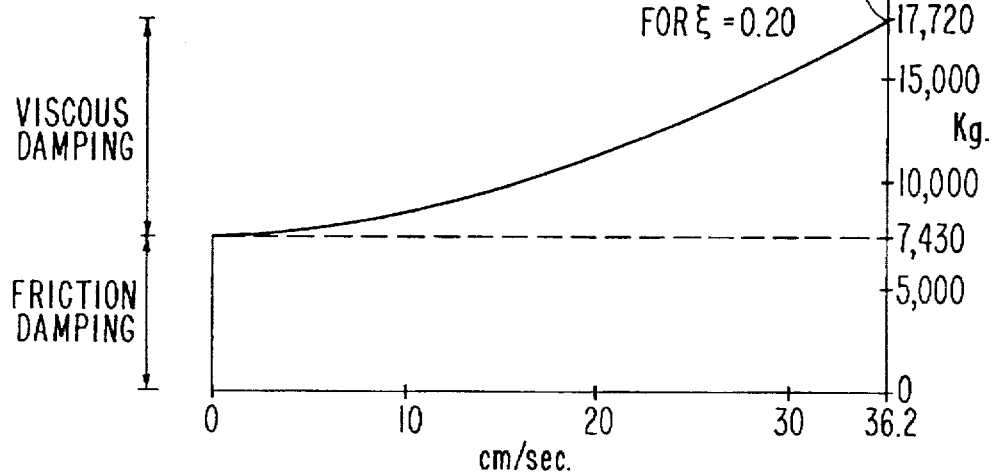
FIG. 16 is a diagram of velocity in relation to damping force, representing results of testing of large displacements of the slab producing high velocities, relative to the damping forces provided by the system.

FIG. 16 shows the Relative Velocity—Damping Force diagram that corresponds to the trilinear case described in paragraph (b) below—i.e., a case in which high displacements and velocities have the main influence on the dynamic responses.

As illustrated in FIG. 15, the isolating system can be:

a. Bilinear for amplitudes of less than 3.81 cm. from the historic value of Xg (horizontal displacement when there is no rod flexion). The damping force due to friction will be Fs=830 Kg. and the spring constant will be the sum of that of the rods (Kb=475 Kg/cm) and that of the pendulum (Kp=1,280 Kg/cm), as shown on lines "bc" and "ef" of the Force-Displacement graph of FIG. 15;—and b. Trilinear in the cases where the displacements indicated in the above paragraph (a) are higher than 3.81 cm, as represented by the line "cd" of the graph of FIG. 12, in which the spring constant is that of the pendulum (Kp=1,280 Kg/cm), and the damping forces caused by friction are the sum of those caused by the damping system and the steel plates used to cover the gap (Fs=830 Kg), and that due to friction on the rod knuckle joints (Fr=6,600 Kg).

For the cases mentioned in the above paragraph "a", the natural period is T=5.32 sec. For those mentioned in the above paragraph "b", the nonlinearity is reduced as the relative displacement increases and what is known as the "secant"stiffness approaches the stiffness of the pendulum; also, the natural period (T=6.1 sec) of the isolating system approaches that of a nonlinear isolator paragraph, but only for specialists on seismical structural analysis. Those of skill in the art will appreciate that both periods are sufficiently high, compared with the mentioned dominant period (0.7 sec.) of the ground, to afford effective isolation and damping. Further, it will be clear that the potentially adverse effects of the nonlinearity of damping and of isolators, with their special characteristics, do not unfavorably affect their expected effectiveness.

The described system ensures that the printing presses remain operational even after the strongest earthquake that could reasonably be expected. The easily adjusted damping action provides a level of damping equivalent to 20% of the critical, while nearly eliminating torsional motion. Another important feature of the system is that the effective length of the rods can be easily adjusted in order to eliminate the height differentials which otherwise can be produced by differential settlements of the foundation and the adverse impact that this would have on the base isolation system.

Variations of this system may be effectively implemented for similar applications and for many types of buildings in any geographic location in which the typical, large dominant periods of the ground have almost eliminated the practical employment of conventional base isolation systems; on the other hand, for locations at which the dominant period is short, the system of the invention can be implemented in a more simplified version.

Figure 17:
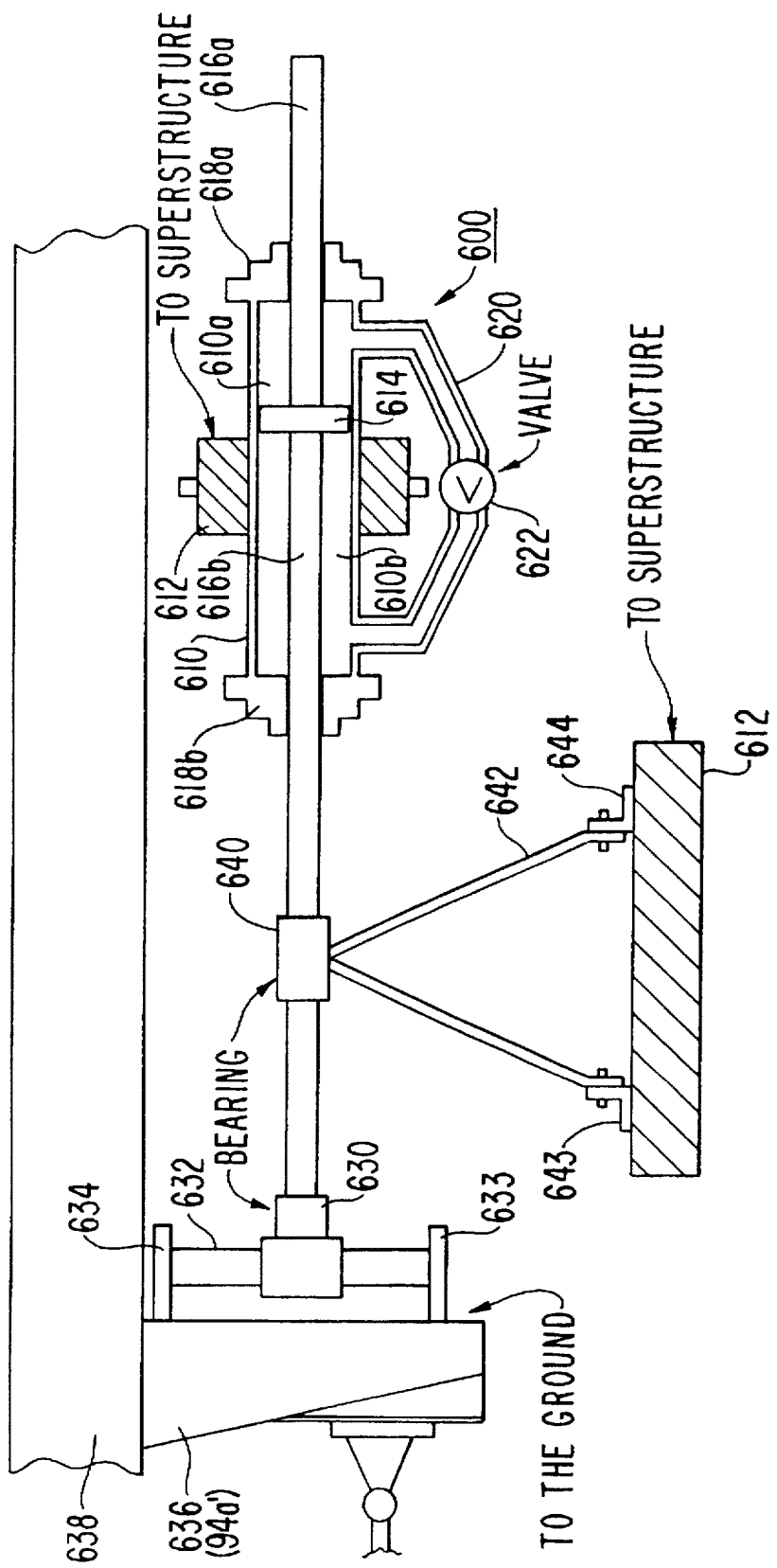
FIG. 17 illustrates an alternative embodiment of a damper having application to stabilization systems as disclosed herein and also in the above-referenced prior U.S. Pat. 4,860,507 and 5,152,110.

FIG. 17, moreover, illustrates an alternative embodiment of a damper 600 suitable for use in the systems of the present invention and of the prior U.S. Pat. Nos. 5,152,110 and 4,860,507, among others. In FIG. 17, damper 600 comprises a cylindrical housing 610 secured by a bracket 612 to a superstructure, e.g., the slab 200; a piston 614 therewithin is connected to dual piston rods 616a and 616b which travel through respective end closures 618a and 618b of the housing 610 in an axial, sliding direction. Hydraulic fluid within the interior chambers 610a and 610b passes through a conduit 620 and an adjustable valve 622 to produce damped linear movement of the piston 614 and its associated piston rods relative to the housing 610. The valve 622 may be selectively adjustable, or may accommodate a selected orifice plug in accordance with the foregoing disclosures, to adjust the damping level.

The dual piston rods 616a and 616b occupy corresponding volumetric amounts, relative to the amounts of fluid within the chambers 610a and 610b, and thus maintain the same change of fluid volume on both sides of the piston for both directions of the linear displacements thereof.

The piston rod 616b (or an extension thereof) is connected at a free end thereof to a bearing 630 and receives, in sliding movement thereon, a further bearing 640. The bearing 630 is received for free, axial sliding movement on a rod 632 journaled at its opposite ends by brackets 633, 634, to a bracket 636 mounted on a foundation wall 638 secured in the ground. The bearing 640, moreover, is supported by a V-shaped bracket 642 connected for pivotal movement at brackets 643, 644, to the superstructure 612. This mounting for the damper 600 will be seen to correspond to that of FIGS. 12A–12C.

The damper 600 of FIG. 17, moreover, may be employed as a direct replacement, for example, for the damper 100 in FIG. 5 of the U.S. Pat. No. 5,152,110 patent and wherein the bracket 636 of FIG. 17 would correspond to the bracket 94a' in FIG. 5 of that patent and which would then be connected to the linkage structure (link 110 and differential coupler 112) and related such elements therein. Moreover, the pivotal and sliding arrangement afforded by components 630–644 in FIG. 17 could be replaced by the link 104 and pivotal couplers connected to the piston rod 102 in FIG. 5 of the referenced patent.

In those cases in which seismic disturbances are not expected to change appreciably the position of the center of gravity of the isolated mass (e.g., the slab 200) relative to the base isolation system, then the mechanical linkage and/or L-shaped dampers with interconnection therebetween, of the preceding embodiments may be omitted and, instead, only dampers as shown in FIG. 17 may be employed; the dampers would be disposed about the perimeter of the slab 200 and/or of the floor 5 in FIG. 1, for example, in the arrangements of orthogonally related pairs as hereinabove disclosed. Further, by appropriate adjustment of the valves 622, gyration of the isolated mass could then be maintained within desirable limits.

Accordingly, it will be apparent to those of skill in the art that the system of the invention is subject to many modifications and adaptations and, thus, it is intended by the appended claims to encompass all such modifications and adaptations which fall within the true spirit and scope of the invention.

What is claimed is:

1. A stabilization system for protecting a structure having an associated foundation formed in the earth from the effects of seismic disturbances, the structure comprising at least a horizontally disposed slab having first and second longitudinal edges and first and second lateral ends, the stabilization system comprising:

a base isolation system comprising plural support columns affixed to the foundation arranged in a first row of plural first support columns, spaced longitudinally along and disposed adjacent to the first longitudinal edge of the slab, and a second row of plural second support columns, spaced longitudinally along and disposed adjacent to the second longitudinal edge of the slab, the plural first and plural second support columns further being arranged in respective, opposed pairs in the lateral direction;

pendulum support elements having corresponding upper ends connected to the plural support columns, respectively, and corresponding lower ends connected to the slab at corresponding connection positions spaced along the respective longitudinal edges thereof adjacent the corresponding support columns, the plural pendulum support elements supporting the slab in suspension from the respective support columns while affording limited relative movement between the slab and the support columns, thereby to limit the transmission, to the slab, of movement of the earth and foundation resultant from a seismic disturbance;

a damping system connected between the slab and the foundation and comprising plural hydraulic dampers arranged as first and second orthogonally related damping subsystems symmetrically disposed relatively to the center of gravity of the slab and damping relative linear displacements, respectively in the lateral and longitudinal directions, between the slab and the support columns and impeding action of forces tending to produce relative rotation between the slab and the plural support columns; and a level monitoring system comprising plural level monitoring detectors affixed to the slab at respective, plural monitoring positions spaced longitudinally along the first and second longitudinal edges of the slab, respectively at the plural connection positions of the corresponding pendulum support elements, the detectors detecting differential changes in the respective levels of the corresponding slab monitoring positions.

2. A stabilization system as recited in claim 1, wherein: the first damping subsystem further comprises:

a first pair of first and second dampers, each of an L-shaped configuration, symmetrically connected to the slab at respective and longitudinally spaced, laterally central positions and having respective first legs with corresponding first pistons extending in opposite lateral directions respectively toward the first and second longitudinal edges of the slab and connected by corresponding first and second mechanical connections to the foundation and having respective second legs with corresponding second pistons extending in opposite longitudinal directions toward each other and mechanically interconnected, and a second pair of first and second dampers, each of an L-shaped configuration and having respective first and second legs with corresponding first and second pistons, symmetrically connected to the slab at respective and longitudinally spaced, laterally central positions and in mirror-relationship relatively to the first pair of first and second dampers, the respective first legs having the corresponding first pistons thereof connected by corresponding third and fourth mechanical connections to the foundation and the respective second legs having the corresponding second pistons thereof mechanically interconnected; and the second damping subsystem further comprises:

a third pair of first and second dampers, each of an L-shaped configuration, symmetrically connected to the slab at respective, first and second laterally spaced positions respectively adjacent the first and second longitudinal edges of the slab and at a first common longitudinal location and having respective first legs with corresponding first pistons extending in opposite longitudinal directions and mechanically connected by corresponding fifth and sixth mechanical connections to the foundation and having respective second legs with corresponding second pistons extending in opposite lateral directions toward each other and mechanically interconnected, and a fourth pair of first and second dampers, each of an L-shaped configuration and having respective first and second legs with corresponding first and second pistons and symmetrically connected to the slab at respective, third and fourth laterally spaced positions respectively adjacent the first and second longitudinal edges of the slab and at a second common longitudinal location, in mirror-relationship relatively to the third pair of first and second dampers, the respective first legs having the corresponding first pistons thereof connected by corresponding seventh and eighth mechanical connections to the foundation and the respective second legs having the corresponding second pistons thereof mechanically interconnected.

3. A structure stabilization system as recited in claim 1 wherein:

each of the first through fourth mechanical connections to the foundation of the first damping subsystem comprises:

a mount, affixed to the foundation, extending in the longitudinal direction and having a bearing thereon which is moveable along the mount axially in the longitudinal direction and rotatable about the axial longitudinal direction, and a mechanical linkage interconnecting the bearing and the first piston rod of the first leg of the respective one of the first and second dampers of each of the first and second pairs thereof; and each of the fifth through eighth mechanical connections to the foundation, of the second damping subsystem, comprises:

a mount, affixed to the foundation, extending in the lateral direction adjacent the corresponding longitudinal edge of the slab and having a bearing thereon which is moveable along the mount axially in the lateral direction and rotatable about the axial lateral direction, and a mechanical linkage interconnecting the bearing and the first piston rod of the first leg of the respective one of the first and second dampers of each of the third and fourth pairs thereof.

4. A structure stabilization system as recited in claim 3, wherein each of the first through eighth mechanical connections permits an extent of relative vertical displacement between the slab and the foundation determined in accordance with the maximum computed relative vertical displacement resulting from an expected maximum seismic disturbance.

5. A structure stabilization system as recited in claim 1, wherein:

the first damping subsystem permits a limited extent of unimpeded, relative longitudinal and relative vertical movement between the slab and the foundation and a limited extent of damped relative lateral movement therebetween;

the second damping subsystem permits a limited extent of unimpeded, relative vertical and relative lateral movement between the slab and the foundation and a limited extent of damped relative longitudinal movement therebetween; and the limited extent of relative longitudinal, vertical and lateral movements in each instance is determined in accordance with the maximum expected seismic force and the calculated response of the structure to the maximum expected seismic force.

6. A stabilization system as recited in claim 1, wherein each of the pendulum support elements comprises:

a rod having upper and lower distal ends;

a knuckle joint, including a knuckle engaging element affixed to the corresponding connection position of the slab, the lower distal end of the associated rod having a knuckle element received in and frictionally engaged by the knuckle engaging element and producing frictional damping of any relative movement therebetween, the frictional damping between the pendulum support elements and the respective knuckle engaging elements producing corresponding damping of relative movement between the slab and the support columns; and a support affixed to the upper ends of the associated support column and receiving therethrough the upper distal end of the associated rod, each upper distal end of each rod being threaded and being held in position on the support by a threaded nut received in threaded engagement thereon.

7. A stabilization system as recited in claim 1, wherein the level monitoring system further comprises:

plural fluid connection elements respectively located at the plural level monitoring positions;

a fluid conduit interconnecting the plural fluid connection elements in series;

plural tubes connected respectively to the plural fluid connection elements, each tube being vertically oriented and having a graduated scale thereon;

a liquid filling the conduit and the respectively connected, plural fluid connection elements and plural vertical tubes;

plural adjustable mounts attached to the slab respectively at the plural monitoring positions, each level monitoring detector being defined by a corresponding fluid connection element supported by a respective adjustable mount and with liquid at least partially filling the tube and communicating through the associated fluid connection element with the fluid conduit, each level detecting monitor being adjustable, by adjustment of the associated adjustable mount, vertically relatively to the slab thereby to adjust the level of liquid in the corresponding tube so as to establish, in an initial, level condition of the slab, a common vertical level of the liquid in the plurality of tubes of the respective, plural level monitoring detectors; and a differential change in the level of the liquid in one tube relative to the respective liquid levels in other tubes, of the plural level monitoring detectors, affording an indication of a detected, differential change in the respective levels of the plural monitoring positions of the slab.

8. A stabilization system as recited in claim 7, wherein: each monitoring detector further comprises:

a probe for detecting the surface level of the liquid within the tube and producing a corresponding output indicative of the detection of the liquid level within the tube.

9. A stabilization system as recited in claim 5 wherein the monitoring detector further comprises:

a probe for detecting the surface level of the liquid within the tube and producing a corresponding output indicative of the detection of the liquid level within the tube; and a graduated scale on each tube relatively to which the liquid level is measurable, in response to the output.

10. A stabilization system as recited in claim 9, wherein:

the liquid is mercury;

the probe is moveable within the tube from a first position displaced by a gap from the surface level of mercury therewithin to a second position in electrical contact with the mercury; and the detecting means further comprises an electrical circuit which interconnects the probe and the mercury exteriorally of the tube, the gap produced by the first position of the probe causing a normal open circuit condition of the electrical circuit and electrical contact of the probe with the mercury in the second position of the probe completing the electrical circuit.

11. A stabilization system as recited in claim 9, further comprising an electrical source and an alarm connected in series with the gap in the electrical circuit, completing of the electrical circuit activating the alarm from the electrical source.

12. A stabilization system as recited in claim 7, wherein the detecting means further comprises:

a micrometer, the micrometer having a body mounted in fixed relationship to the tube and a micrometer probe movable within the tube, selectively from a first position displaced from, to a second position in contact with, the surface level of the liquid within the tube.

13. A stabilization system as recited in claim 10, wherein:

the vertical tube receives therewithin a conductive cylinder which floats in, and has an end surface which extends above the surface level of, the mercury; and the probe of the micrometer is movable into and out of contact with the end surface of the conductive cylinder for deriving a measurement of the surface level of the mercury within the tube.

14. A stabilization system recited in claim 10, wherein:

each vertical tube receives therewithin a corresponding float which floats in, and has an end surface which extends above the surface level of, the mercury, the end surface defining a target monitored by the probe.

15. A stabilization system as recited in claim 14, wherein the probe comprises a proximity detector for detecting the surface level of mercury within the vertical tube.

16. A stabilization system as recited in claim 9, wherein:
the liquid is mercury;
each vertical tube receives therewithin a corresponding conductive cylinder which floats in, and has an end surface which extends above the surface level of, the mercury;
the probe is moveable within the tube from a first position displaced by a gap from the end surface of the conductive cylinder to a second position in electrical contact with the end surface of the conductive cylinder; and
the detecting means further comprises an electrical circuit which interconnects the probe and the mercury exteriorally of the two, the gap in the first position in the probe causing a normal open circuit condition of the electrical circuit and the second position of the probe in electrical contact with the end surface of the conductive cylinder completing the electrical circuit.

17. A stabilization system as recited in claim 16, further comprising an electrical source and an alarm connected in series with the gap in the electrical circuit, completing of the electrical circuit activating the alarm from the electrical source.

18. A stabilization system as recited in claim 1, further comprising:
adjustable support elements respectively associated with the plural support columns and corresponding upper ends of the respective pendulum support elements and individually operable to adjust the level of the slab at the corresponding connection position of the lower end of the support column to the slab and thereby to correct for detected, differential changes in the respective levels of the corresponding slab monitoring positions.

19. A stabilization system as recited in claim 6, wherein each of the pendulum support elements further comprises:
a knuckle joint, including a knuckle engaging element connected to the support columns, the upper distal end of the associated rod having a knuckle element received in and frictionally engaged by the knuckle engaging element and producing frictional, damping of any relative movement therebetween.

20. A stabilization system for protecting a structure having an associated foundation formed in the earth from the effects of seismic disturbances, the structure comprising at least a horizontally disposed slab having first and second longitudinal edges and first and second lateral ends, the stabilization system comprising:
a base isolation system comprising plural support columns affixed to the foundation arranged in a first row of plural first support columns, spaced longitudinally along and disposed adjacent to the first longitudinal edge of the slab, and a second row of plural second support columns, spaced longitudinally along and disposed adjacent to the second longitudinal edge of the slab, the plural first and plural second support columns further being arranged in respective, opposed pairs in the lateral direction;
pendulum support elements having corresponding upper ends connected to the plural support columns, respectively, and corresponding lower ends connected to the slab at corresponding connection positions spaced along the respective longitudinal edges thereof adjacent the corresponding support columns, the plural pendulum support elements supporting the slab in suspension from the respective support columns while affording limited relative movement between the slab and the support columns, thereby to limit the transmission, to the slab, of movement of the earth and foundation resultant from a seismic disturbance;
a damping system connected between the slab and the foundation and comprising plural hydraulic dampers arranged as first and second orthogonally related damping subsystems symmetrically disposed relatively to the center of gravity of the slab and damping relative linear displacements, respectively in the lateral and longitudinal directions, between the slab and the support columns and impeding action of forces tending to produce relative rotation between the slab and the plural support columns; and
each hydraulic damper further comprises:
a cylinder defining an axis extending in the respective one of the lateral and longitudinal directions,
a piston axially movable within the cylinder, and defining first and second subchambers therein of respective, differing volumes in accordance with differing axial positions of the piston within the cylinder,
first and second piston rods connected to the piston and extending in opposite axial directions from the piston through the first and second subchambers, respectively, and exiting in sealed relationship from corresponding opposite ends of the cylinder, the first piston rod having a free end coupled to the foundation and the cylinder being coupled to the slab,
first and second conduits connected at respective first ends thereof to the corresponding first and second subchambers and having respective, second ends, and
a flow regulator interconnecting the second ends of the first and second conduits and selectively regulating the flow of hydraulic fluid therethrough and, thereby, the level of damping afforded by the damper.

21. A stabilization system as recited in claim 20, further comprising plural mounts respectively associated with the plural dampers, each mount attached to the foundation and having a shaft disposed in a second direction, transverse to the axis of the first piston rod and which receives a first bearing thereon which is freely, axially movable relatively to the shaft and to which the free end of the first piston rod is connected, for coupling the first piston rod to the foundation.

22. A stabilization system as recited in claim 21 further comprising a mounting bracket pivotally connected to the slab and having a free end movable in a third direction, transverse to both the axis of the first piston rod and the second direction, and a second bearing, secured on the free end of the mounting bracket and received on the first piston rod and freely axially movable on, and relatively to, the first piston rod.

23. A stabilization system for protecting a structure having an associated foundation from the effects of seismic disturbances, comprising:
a horizontally disposed slab having an edge;
a base isolation system including plural support columns affixed to the foundation and spaced along the edge of the slab;
pendulum support elements having corresponding upper ends supported by the plural support columns, respectively, and corresponding lower ends connected to the slab, the pendulum support elements supporting the slab in suspension from the respective support columns while affording limited relative movement between the slab and the support columns, thereby to limit the transmission, to the slab, of movement of the foundation resultant from a seismic disturbance;

a damping system connected between the slab and the foundation and including plural hydraulic dampers arranged as first and second orthogonally related damping subsystems symmetrically disposed relatively to a center of gravity of the slab and damping relative linear displacements, respectively, in lateral and longitudinal directions, between the slab and the support columns and impeding action of forces tending to produce relative rotation between the slab and the plural support columns; and a level monitoring system including plural level monitoring detectors at the slab which detect differential changes in the level of the slab.

24. A structure stabilization system as recited in claim 23, wherein:

the first damping subsystem permits a limited extent of unimpeded, relative longitudinal and relative vertical movement between the slab and the foundation, and a limited extent of damped relative lateral movement therebetween;

the second damping subsystem permits a limited extent of unimpeded, relative vertical and relative lateral movement between the slab and the foundation, and a limited extent of damped relative longitudinal movement therebetween; and the limited extent of relative longitudinal, vertical and lateral movements in each instance is determined in accordance with the maximum expected seismic force and the calculated response of the structure to the maximum expected seismic force.

25. A stabilization system as recited in claim 23, wherein each of the pendulum support elements comprises:

a rod having upper and lower distal ends; and a knuckle joint, including a knuckle engaging element affixed to the slab, the lower distal end of the associated rod having a knuckle element received in and frictionally engaged by the knuckle engaging element and producing frictional damping of any relative movement therebetween, the frictional damping producing corresponding damping of relative movement between the slab and the support columns.

26. A stabilization system as recited in claim 25, wherein each of the pendulum support elements further comprises:

a knuckle joint, including a knuckle engaging element connected to the support columns, the upper distal end of the associated rod having a knuckle element received in and frictionally engaged by the knuckle engaging element and producing frictional damping of any relative movement therebetween.

27. A stabilization system as recited in claim 23, further comprising:

adjustable support elements respectively associated with the plural support columns and corresponding upper ends of the respective pendulum support elements and individually operable to adjust the level of the slab and thereby correct detected, differential changes in the level of the slab.

28. A structure stabilization system as recited in claim 27, wherein each of the adjustable support elements comprises:

a support affixed to an upper end of each of the plural support columns and receiving therethrough the upper distal end of the associated rod, and each upper distal end of each rod is threaded and is held in position on the support by a threaded nut received in threaded engagement thereon.

29. A stabilization system for protecting a structure having an associated foundation from the effects of seismic disturbances, comprising:

a horizontally disposed slab having an edge;

a base isolation system including plural support columns affixed to the foundation and spaced along the edge of the slab;

pendulum support elements having corresponding upper ends supported by the plural support columns, respectively, and corresponding lower ends connected to the slab, the pendulum support elements supporting the slab in suspension from the respective support columns while affording limited relative movement between the slab and the support columns, thereby to limit the transmission, to the slab, of movement of the foundation resultant from a seismic disturbance;

a damping system connected between the slab and the foundation and including plural hydraulic dampers arranged as first and second orthogonally related damping subsystems symmetrically disposed relatively to a center of gravity of the slab and damping relative linear displacements, respectively in lateral and longitudinal directions, between the slab and the support columns and impeding action of forces tending to produce relative rotation between the slab and the plural support columns, wherein each of the hydraulic dampers includes:

a cylinder defining an axis extending in the respective one of the lateral and longitudinal directions, a piston axially movable within the cylinder, and defining first and second subchambers therein of respective, differing volumes in accordance with differing axial positions of the piston within the cylinder, first and second piston rods connected to the piston and extending in opposite axial directions from the piston through the first and second subchambers, respectively, and exiting in sealed relationship from corresponding opposite ends of the cylinder, the first piston rod having a free end coupled to the foundation and the cylinder being coupled to the slab, first and second conduits connected at respective first ends thereof to the corresponding first and second subchambers and having respective, second ends, and a flow regulator interconnecting the second ends of the first and second conduits and selectively regulating the flow of hydraulic fluid therethrough and, thereby, the level of damping afforded by the damper; and a level monitoring system including plural level monitoring detectors at the slab which detect differential changes in the level of the slab.

30. A stabilization system for protecting a structure having an associated foundation from the effects of seismic disturbances, comprising:

a horizontally disposed slab having an edge;

a base isolation system including plural support columns affixed to the foundation and spaced along the edge of the slab;

pendulum support elements having corresponding upper ends supported by the plural support columns, respectively, and corresponding lower ends connected to the slab, the pendulum support elements supporting the slab in suspension from the respective support columns while affording limited relative movement between the slab and the support columns thereby to limit the transmission, to the slab, of movement of the foundation resultant from a seismic disturbance; and a damping system connected between the slab and the foundation and including plural hydraulic dampers arranged as first and second orthogonally related damping subsystems symmetrically disposed relatively to a center of gravity of the slab and damping relative linear displacements, respectively in lateral and longitudinal directions, between the slab and the support columns and impeding action of forces tending to produce relative rotation between the slab and the plural support columns, wherein each of the hydraulic dampers includes:
- a cylinder defining an axis extending in the respective one of the lateral and longitudinal directions,
- a piston axially movable within the cylinder, and defining first and second subchambers therein of respective, differing volumes in accordance with differing axial positions of the piston within the cylinder,
- first and second piston rods connected to the piston and extending in opposite axial directions from the piston through the first and second subchambers, respectively, and exiting in sealed relationship from corresponding opposite ends of the cylinder, the first piston rod having a free end coupled to the foundation and the cylinder being coupled to the slab,
- first and second conduits connected at respective first ends thereof to the corresponding first and second subchambers and having respective, second ends, and
- a flow regulator interconnecting the second ends of the first and second conduits and selectively regulating the flow of hydraulic fluid therethrough and, thereby, the level of damping afforded by the damper.

* * * * *

UNITED STATES PATENT AND TRADEMARK OFFICE
CERTIFICATE OF CORRECTION

PATENT NO.: 5,797,227
DATED : August 25, 1998
INVENTOR(S): Federico GARZA-TAMEZ

It is certified that error appears in the above-identified patent and that said Letters Patent is hereby corrected as shown below:

Col. 7, line 44, delete "associated";
line 45, after "80" insert --. A--.

Col. 9, line 9, delete "75".

Col. 12, line 23, change "as" to --. As--.

Col. 18, line 30, change "knuckles" to --knuckle--.

UNITED STATES PATENT AND TRADEMARK OFFICE
CERTIFICATE OF CORRRECTION

PATENT NO. : 5,797,227　　　　　　　　　　　　Page 2 of 7
DATED : August 25, 1998
INVENTOR(S) : Federico GARZA-TAMEZ It is certified that error appears in the above-identified patent and that said Letters Patent is hereby corrected as shown below:

On the title page, insert following item [56] for reference:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 9 | 9 | 9 | 7 | 3 | | 02/18/70 | Touaillon | | | |
| | | 9 | 2 | 9 | 5 | 4 | 2 | 07/27/09 | Boermel | | | |
| | | 2 | 0 | 0 | 1 | 1 | 6 | 9 | 05/14/35 | Wallace | | | |
| | | 2 | 0 | 1 | 4 | 6 | 4 | 3 | 09/17/35 | Bakker | | | |
| | | 2 | 2 | 0 | 8 | 8 | 7 | 2 | 07/23/40 | Ropp | | | |
| | | 2 | 7 | 0 | 5 | 9 | 2 | 8 | 04/12/55 | Pont | | | |
| | | 2 | 8 | 2 | 8 | 5 | 8 | 9 | 04/01/58 | Hercik | | | |
| | | 2 | 9 | 5 | 0 | 5 | 7 | 6 | 08/30/60 | Rubenstein | | | |
| | | 3 | 3 | 4 | 7 | 0 | 0 | 2 | 10/17/67 | Penkuhn | | | |
| | | 3 | 5 | 2 | 9 | 9 | 1 | 9 | 09/22/70 | W. Tiraspolsky et al. | | | |

UNITED STATES PATENT AND TRADEMARK OFFICE
CERTIFICATE OF CORRRECTION

PATENT NO. : 5,797,227  Page 3 of 7
DATED : August 25, 1998
INVENTOR(S) : Federico GARZA-TAMEZ It is certified that error appears in the above-identified patent and that said Letters Patent is hereby corrected as shown below:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 7 | 3 | 0 | 4 | 6 | 3 | 05/01/73 | Richard | | | |
| | | 3 | 7 | 6 | 2 | 1 | 1 | 4 | 10/02/73 | Eskijian | | | |
| | | 3 | 9 | 4 | 0 | 8 | 9 | 5 | 03/02/76 | Yamamoto et al. | | | |
| | | 3 | 9 | 7 | 3 | 0 | 7 | 8 | 08/03/76 | Wolf et al. | | | |
| | | 3 | 9 | 8 | 6 | 3 | 6 | 7 | 10/19/76 | Kalpins | | | |
| | | 4 | 1 | 8 | 8 | 6 | 8 | 1 | 02/19/80 | Tada et al. | | | |
| | | 4 | 2 | 0 | 9 | 8 | 6 | 8 | 07/01/80 | Tada et al. | | | |
| | | 4 | 3 | 2 | 0 | 5 | 4 | 9 | 03/23/82 | Greb | | | |
| | | 4 | 3 | 2 | 8 | 6 | 4 | 8 | 05/11/82 | Kalpins | | | |
| | | 4 | 5 | 1 | 4 | 9 | 4 | 2 | 05/07/85 | Pocanschi | | | |

UNITED STATES PATENT AND TRADEMARK OFFICE
CERTIFICATE OF CORRRECTION

PATENT NO. : 5,797,227
DATED : August 25, 1998
INVENTOR(S) : Federico GARZA-TAMEZ Page 4 of 7

It is certified that error appears in the above-identified patent and that said Letters Patent is hereby corrected as shown below:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 5 | 1 | 7 | 7 | 8 | 05/21/85 | Nicolai | | | |
| | | 4 | 6 | 4 | 4 | 7 | 1 | 4 | 02/24/87 | Zayas | | | |
| | | 4 | 6 | 6 | 2 | 1 | 4 | 2 | 05/05/87 | Weiner | | | |
| | | 4 | 7 | 2 | 6 | 1 | 6 | 1 | 02/23/88 | Yaghoubian | | | |
| | | 4 | 7 | 6 | 6 | 7 | 0 | 6 | 08/30/88 | Caspe | | | |
| | | 4 | 7 | 6 | 6 | 7 | 0 | 8 | 08/30/88 | Sing | | | |
| | | 4 | 7 | 9 | 3 | 1 | 0 | 5 | 12/27/88 | Caspe | | | |
| | | 4 | 7 | 9 | 9 | 3 | 3 | 9 | 01/24/89 | Kobori et al. | | | |
| | | 4 | 8 | 8 | 1 | 3 | 5 | 0 | 11/21/89 | Wu | | | |
| | | 4 | 8 | 8 | 3 | 2 | 5 | 0 | 11/28/89 | Yane et al. | | | |

UNITED STATES PATENT AND TRADEMARK OFFICE
CERTIFICATE OF CORRRECTION

PATENT NO. : 5,797,227
DATED : August 25, 1998
INVENTOR(S) : Federico GARZA-TAMEZ It is certified that error appears in the above-identified patent and that said Letters Patent is hereby corrected as shown below:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 8 | 8 | 7 | 7 | 8 | 8 | 12/19/89 | Fischer et al. | | | |
| | | 4 | 9 | 2 | 2 | 6 | 7 | 1 | 05/08/90 | Sato | | | |
| | | 4 | 9 | 2 | 4 | 6 | 3 | 9 | 05/15/90 | Sato et al. | | | |
| | | 4 | 9 | 2 | 4 | 6 | 4 | 0 | 05/15/90 | Suizu et al. | | | |
| | | 4 | 9 | 5 | 6 | 9 | 4 | 7 | 09/18/90 | Middleton | | | |
| | | 4 | 9 | 7 | 2 | 6 | 3 | 6 | 11/27/90 | Noji et al. | | | |
| | | 4 | 9 | 7 | 4 | 3 | 7 | 8 | 12/04/90 | Shustov | | | |
| | | 5 | 0 | 7 | 1 | 2 | 6 | 1 | 12/10/91 | Stuve | | | |
| | | 5 | 1 | 0 | 7 | 6 | 3 | 4 | 04/28/92 | Onoda et al. | | | |
| | | 5 | 1 | 6 | 8 | 6 | 7 | 3 | 12/08/92 | Nemir et al. | | | |

UNITED STATES PATENT AND TRADEMARK OFFICE
CERTIFICATE OF CORRRECTION

PATENT NO. : 5,797,227
DATED : August 25, 1998
INVENTOR(S): Federico GARZA-TAMEZ It is certified that error appears in the above-identified patent and that said Letters Patent is hereby corrected as shown below:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 1 | 6 | 8 | 9 | 6 | 7 | 12/08/92 | Abiru et al. | | | |
| | | 5 | 1 | 8 | 2 | 8 | 8 | 7 | 02/02/93 | Uno et al. | | | |
| | | 5 | 2 | 3 | 3 | 7 | 9 | 7 | 08/10/93 | Uno et al. | | | |
| | | 5 | 2 | 3 | 9 | 7 | 8 | 9 | 08/31/93 | Uno et al. | | | |
| | | 5 | 2 | 5 | 5 | 7 | 6 | 4 | 10/26/93 | Kurabayashi et al. | | | |
| | | 5 | 2 | 5 | 9 | 1 | 5 | 9 | 11/09/93 | Kawase et al. | | | |
| | | 5 | 2 | 6 | 5 | 3 | 8 | 7 | 11/30/93 | Ishimaru et al. | | | |
| | | 5 | 2 | 8 | 8 | 0 | 6 | 0 | 02/22/94 | Tyutinman | | | |
| | | 5 | 3 | 1 | 0 | 1 | 5 | 6 | 05/10/94 | Matsumura et al. | | | |
| | | 5 | 3 | 1 | 1 | 7 | 0 | 9 | 05/17/94 | Kobani et al. | | | |

UNITED STATES PATENT AND TRADEMARK OFFICE
CERTIFICATE OF CORRRECTION

PATENT NO. : 5,797,227
DATED : August 25, 1998
INVENTOR(S) : Federico GARZA-TAMEZ It is certified that error appears in the above-identified patent and that said Letters Patent is hereby corrected as shown below:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 4 | 5 | 2 | 5 | 4 | 8 | 09/26/95 | Kwon | | | |
| | | 5 | 5 | 0 | 5 | 0 | 2 | 6 | 04/09/96 | Fausto | | | |
| | | 5 | 5 | 2 | 6 | 6 | 0 | 9 | 06/18/96 | Lee et al. | | | |
| | | 5 | 5 | 3 | 3 | 3 | 0 | 7 | 07/09/96 | Tsai et al. | | | |
| | | 5 | 5 | 4 | 4 | 4 | 5 | 1 | 08/13/96 | Cheng et al. | | | |
| | | 5 | 5 | 4 | 4 | 4 | 5 | 2 | 08/13/96 | Fujita et al. | | | |
| | | 5 | 4 | 4 | 2 | 8 | 8 | 3 | 08/22/95 | Nishimura et al. | | | |

Signed and Sealed this

Eleventh Day of May, 1999

Attest:

Q. TODD DICKINSON

*Attesting Officer*  *Acting Commissioner of Patents and Trademarks*